United States Patent
Gangakhedkar et al.

(10) Patent No.: US 11,304,171 B2
(45) Date of Patent: Apr. 12, 2022

(54) COMMUNICATION NODES AND METHODS FOR IMPLEMENTING A POSITIONING-RELATED SIGNALLING EXCHANGE

(71) Applicant: Huawei Technologies Co., Ltd., Shenzhen (CN)

(72) Inventors: Sandip Gangakhedkar, Munich (DE); Karabulut Umur, Munich (DE); Liang Hu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/380,772

(22) Filed: Apr. 10, 2019

(65) Prior Publication Data
US 2019/0239181 A1 Aug. 1, 2019

Related U.S. Application Data

(63) Continuation of application No. PCT/EP2016/074215, filed on Oct. 10, 2016.

(51) Int. Cl.
*H04W 64/00* (2009.01)
*H04W 4/02* (2018.01)
(Continued)

(52) U.S. Cl.
CPC ............. *H04W 64/00* (2013.01); *H04W 4/02* (2013.01); *H04W 4/06* (2013.01); *H04W 40/22* (2013.01);
(Continued)

(58) Field of Classification Search
CPC ..... H04W 4/00–06; H04W 4/38; H04W 4/70; H04W 4/80; H04W 4/30; H04W 8/02;
(Continued)

(56) References Cited

U.S. PATENT DOCUMENTS

2006/0267841 A1* 11/2006 Lee ........................... G01S 5/06
342/463
2012/0249372 A1 10/2012 Jovicic et al.
(Continued)

FOREIGN PATENT DOCUMENTS

CN 101583078 A 11/2009
CN 103841636 A 6/2014
(Continued)

OTHER PUBLICATIONS

"System level evaluation results for D2D aided positioning," 3GPP TSG RAN WG1 Meeting #82, R1-154280, Beijing, China, XP051001611, pp. 1-6, 3rd Generation Partnership Project—Valbonne, France (Aug. 24-28, 2015).
(Continued)

*Primary Examiner* — San Htun
(74) *Attorney, Agent, or Firm* — Leydig, Voit & Mayer, Ltd.

(57) ABSTRACT

A node comprises a location unit determines that the node requires positioning support from the anchor nodes, and a transmitter to transmit a request for positioning support from the anchor nodes. The node comprises a selection unit to select a set of the plurality of anchor nodes for providing positioning support following the transmission of the request. It also causes the transmitter to transmit an instruction to each anchor node in the set that instructs that anchor node to provide positioning support to the node via a sidelink between that respective anchor node and the node. The request for positioning support is transmitted at a time that suits the node, in dependence on its own situation and the requirements of any applications it might be running. The selection unit enables the node to make a dynamic selection of appropriate anchor nodes at the time when the node needs positioning support.

9 Claims, 16 Drawing Sheets

(51) Int. Cl.
  *H04W 40/22* (2009.01)
  *H04W 88/04* (2009.01)
  *H04W 4/06* (2009.01)
  *H04W 76/10* (2018.01)
  *H04W 76/14* (2018.01)
  *H04W 76/40* (2018.01)

(52) U.S. Cl.
  CPC ........... *H04W 76/10* (2018.02); *H04W 76/14* (2018.02); *H04W 76/40* (2018.02); *H04W 88/04* (2013.01)

(58) Field of Classification Search
  CPC ........... H04W 8/08–205; H04W 76/10; H04W 76/14–16; H04W 76/18; H04W 76/23; H04W 84/005; H04W 84/10; H04W 84/18; H04W 88/02; H04W 88/04; H04W 88/06; H04W 40/22
  See application file for complete search history.

(56) References Cited

U.S. PATENT DOCUMENTS

| | | | |
|---|---|---|---|
| 2013/0303160 A1* | 11/2013 | Fong | H04B 7/0456 455/426.1 |
| 2013/0315079 A1 | 11/2013 | Edge | |
| 2014/0003262 A1* | 1/2014 | He | H04L 5/14 370/252 |
| 2014/0120947 A1 | 5/2014 | Siomina | |
| 2015/0018017 A1 | 1/2015 | Jang et al. | |
| 2016/0095080 A1* | 3/2016 | Khoryaev | H04W 64/00 455/456.1 |
| 2016/0095092 A1 | 3/2016 | Khoryaev et al. | |
| 2016/0252622 A1* | 9/2016 | Levin | G01S 5/0036 342/357.42 |
| 2017/0212206 A1* | 7/2017 | Kim | H04W 8/005 |
| 2017/0359713 A1 | 12/2017 | Fodor et al. | |
| 2018/0035278 A1 | 2/2018 | Aminaka et al. | |

FOREIGN PATENT DOCUMENTS

| | | |
|---|---|---|
| CN | 104244404 A | 12/2014 |
| CN | 104396298 A | 3/2015 |
| CN | 104871616 A | 8/2015 |
| CN | 105075335 A | 11/2015 |
| CN | 105338497 A | 2/2016 |
| WO | 2012135388 A2 | 10/2012 |
| WO | 2013119077 A1 | 8/2013 |
| WO | 2014158062 A1 | 10/2014 |
| WO | 2016048049 A1 | 3/2016 |
| WO | 2016048509 A1 | 3/2016 |
| WO | 2016135790 A1 | 9/2016 |

OTHER PUBLICATIONS

"Analysis of anchored and non-anchored D2D aided positioning," 3GPP TSG RAN WG1 Meeting #82, R1-153991, Beijing, China; XP051001398, pp. 1-6, 3rd Generation Partnership Project—Valbonne, France (Aug. 24-28, 2015).

"3rd Generation Partnership Project; Technical Specification Group Radio Access Network; Study on indoor positioning enhancements for UTRA and LTE(Release 13)," 3GPP TR 37.857 V13.1.0, pp. 1-82, XP051047399, 3rd Generation Partnership Project—Valbonne, France (Dec. 7, 2015).

"Vehicle Positioning for C-ITS in Australia (Background Document)," AP-R431-13, Austroads Research Report, pp. 1-88, Austroads 2013 (Apr. 2013).

Peral-Rosado, "Evaluation of the LTE Positioning Capabilities in Realistic Navigation Channels," Ph.D Dissertation, pp. 1-184, Universitat Autonoma de Barcelona (Mar. 2014).

"3rd Generation Partnership Project; Technical Specification Group Radio Access Network; Evolved Universal Terrestrial Radio Access (E-UTRA); Physical channels and modulation (Release 14)," 3GPP TS 36.211 V14.0.0, pp. 1-170, 3rd Generation Partnership Project—Valbonne, France (Sep. 2016).

"3rd Generation Partnership Project; Technical Specification Group Radio Access Network; Evolved Universal Terrestrial Radio Access (E-UTRA); Physical layer procedures (Release 14)," 3GPP TS 36.213 V14.0.0, pp. 1-406, 3rd Generation Partnership Project—Valbonne, France (Sep. 2016).

"3rd Generation Partnership Project; Technical Specification Group Radio Access Network; Evolved Universal Terrestrial Radio Access (E-UTRA); Multiplexing and channel coding (Release 14)," 3GPP TS 36.212 V14.0.0, pp. 1-148, 3rd Generation Partnership Project—Valbonne, France (Sep. 2016).

"3rd Generation Partnership Project; Technical Specification Group Radio Access Network; Evolved Universal Terrestrial Radio Access (E-UTRA); Radio Resource Control (RRC); Protocol specification(Release 14)," 3GPP TS 36.331 V14.0.0, pp. 1-643, 3rd Generation Partnership Project—Valbonne, France (Sep. 2016).

"3rd Generation Partnership Project; Technical Specification Group Radio Access Network; Evolved Universal Terrestrial Radio Access (E-UTRA); LTE Positioning Protocol (LPP)(Release 13)," 3GPP TS 36.355 V13.1., pp. 1-141, 3rd Generation Partnership Project—Valbonne, France (Mar. 2016).

"3rd Generation Partnership Project; Technical Specification Group Radio Access Network; Study on indoor positioning enhancements for UTRA and LTE (Release 13)," 3GPP TR 37.857 V13.0.0, pp. 1-82, 3rd Generation Partnership Project—Valbonne, France (Sep. 2015).

Dammmann et al, "On Prospects of Positioning in 5G," IEEE ICC 2015, pp. 1-7, Institute of Electrical and Electronics Engineers—New York, New York (2015), Best Available Date: Jun. 8-12, 2015.

Wei Qui et al, "A D2D Relative Positioning System on Smart Devices," 2014 IEEE Wireless Communications and Networking Conference (WCNC), pp. 2168-2172, Institute of Electrical and Electronics Engineers—New York, New York (2014), Best Available Date: Apr. 6-9, 2014.

Woohyun Kim, "Device Positioning Scheme in LTE Network with D2D Signal," Seoul National University, , pp. 1-29, Creative Commons (Feb. 2015).

Schloemann et al, "Effect of Collaboration on Localizability in Range-Based Localization Systems," 2015 IEEE Globecom Workshops (GC Wkshps), pp. 1-7, Institute of Electrical and Electronics Engineers—New York, New York (2015), Best Available Date: Dec. 6-10, 2015.

"Revised SID: Study on Indoor Positioning Enhancements for UTRA and LTE," 3GPP TSG RAN Meeting #65, Edinburgh, Scotland, RP-141102, pp. 1-7, 3rd Generation Partnership Project—Valbonne, France (Sep. 9-12, 2014).

Schloemann et al, "On the Value of Collaboration in Location Estimation," IEEE Transactions on Vehicular Technology, vol. 65, No. 5, pp. 3585-3596, Institute of Electrical and Electronics Engineers—New York, New York (May 2016), Best Available Date: Jun. 4, 2015.

Fischer, "Observed Time Difference Of Arrival(OTDOA) Positioning in 3GPP LTE," pp. 1-62, Qualcomm Technologies, Inc. (Jun. 6, 2014).

* cited by examiner

COMMUNICATION NODES AND METHODS FOR IMPLEMENTING A POSITIONING-RELATED SIGNALLING EXCHANGE

CROSS-REFERENCE TO RELATED APPLICATIONS

This application is a continuation of International Application No. PCT/EP2016/074215, filed on Oct. 10, 2016, the disclosure of which is hereby incorporated by reference in its entirety.

TECHNICAL FIELD

Embodiments of this disclosure relate to communication devices and methods for exchanging positioning-related signalling in a communications system.

BACKGROUND

Future communication systems are likely to place stringent requirements on the accuracy, availability and latency of device positioning. This is partly due to the diverse use cases and applications that are predicted to need positioning information. Many of these anticipated requirements cannot be fulfilled by today's cellular-based positioning solutions. For example, Intelligent Transportation Systems (ITS) are expected to require a positioning accuracy in the range of 0.7 m to 5 m in 95% of cases, depending on the specific use case (ARRB Project Team, "Vehicle Positioning for C-ITS in Australia" (Background Document), Austroads Research Report, April 2013). State of the art orthogonal time difference of arrival (OTDOA) positioning in LTE, in contrast, only provides 63 m accuracy for 95% of cases ("Evaluation of the LTE positioning capabilities in realistic navigation channels", Rosado J. (2014), unpublished PhD thesis, Universitat Autonoma de Barcelona).

Another metric that is likely to have more stringent requirements in future communication systems is availability. Applications such as cooperative driving, emergency call systems and fully autonomous driving require continuous localizability, irrespective of whether the user equipment is in-coverage or out-of-coverage. If there are not enough base stations in the vicinity of a device or if the signal quality from surrounding base stations is poor (for example, due to interference from neighbouring base stations in a single frequency network), the positioning performance of a cellular-based OTDOA scheme can be greatly affected.

Besides accuracy and localizability, latency is likely to be another issue in cellular OTDOA positioning. Convergence time for achieving localisation with a required degree of accuracy is increased by position reference signals that have low signal-to-interference and noise ratios (SINR) and/or by having an insufficient number of position reference signals. Both of these factors reduce the positioning accuracy and, in extreme cases, cause outage. This increase in latency of the positioning service cannot be tolerated by some use cases. This is particularly true for use cases of V2X communication, such as lane-merging or emergency braking.

It is an object to provide concepts for improving the localisation of remote nodes in a communication system.

SUMMARY

The foregoing and other objects are achieved by the features of the independent claims. Further implementation forms are apparent from the dependent claims, the description and the figures.

According to a first aspect, a node is provided for operating in a communication system that comprises a plurality of anchor nodes, whose location is known. The node comprises a location unit configured to determine that the node requires positioning support from the anchor nodes. It also comprises a transmitter configured to transmit a request for positioning support from the anchor nodes. The node comprises a selection unit that is configured to select a set of the plurality of anchor nodes for providing positioning support. The selection unit makes that selection following the transmission of the request. It is also configured to cause the transmitter to transmit an instruction to each anchor node in the set that instructs that anchor node to provide positioning support to the node via a sidelink between that respective anchor node and the node. The transmitter enables the node to transmit the request for positioning support at a time that suits the node, in dependence on its own situation and the requirements of any applications it might be running. The selection unit enables the node to make a dynamic selection of the most appropriate anchor nodes at the time when the node needs positioning support, which contributes to better positioning accuracy in a communication system where the most appropriate anchor nodes for a target node may be continually changing.

The transmitter may be configured to specify, in its request for positioning support, a type of positioning support that it requires. It may also be configured to transmit its request for positioning support over a type of link that is dependent on the specified type of positioning support. The transmitter is thus able to select between different types of positioning support, which enables the node to perform localization in a variety of positioning scenarios, including in-coverage, out-of-coverage and partial or overlapping coverage.

The transmitter may be configured to broadcast its request for positioning support to the plurality of anchor nodes via a sidelink between the node and each of the plurality of anchor nodes. The sidelink provides a means for direct communication between the node and the anchor nodes, which typically provides higher SNRs at the receiving device.

The transmitter may be configured to transmit its request for positioning support via an uplink between the target node and a network node. The transmitter is thus able to access an overview of the available anchor nodes that is obtainable from a centralized network node.

The selection unit may be configured to select the set of anchor nodes in dependence on information about the plurality of anchor nodes that it receives from those anchor nodes and/or from a network node. The selection unit thus makes an informed decision about which anchor nodes to select based on current information about the anchor nodes, which contributes to improved positioning accuracy in a dynamically changing communication system.

The transmitter may be configured to transmit a termination instruction, once the node's location has been determined to a predetermined acceptable accuracy, which will cause the anchor nodes to cease providing the node with positioning support. The node might also transmit a termination instruction after deciding to terminate localisation support from a subset of one or more of the selected anchor nodes due to their poor signal quality or due a detected presence of better alternative anchor nodes (which is termed "anchor reselection" herein). This helps save resources on the sidelink.

According to a second aspect, a node is provided for operating in a communication system that comprises a plurality of anchor nodes, whose location is known, and a target node, whose location is to be determined. The node comprises an input configured to receive a request, from the target node, for positioning support from the anchor nodes. It also comprises a selection unit that is configured to, following receipt of the request by the target node, select a set of the plurality of anchor nodes to provide positioning support to the target node. The selection unit is also configured to cause instructions to be transmitted to anchor nodes in the set that instruct those anchor nodes to provide positioning support to the target node via a sidelink between each of those respective anchor nodes and the target node. The selection unit enables the node to make a dynamic selection of those most appropriate anchor nodes at the time when the target node actually requires positioning support, which contributes to better positioning accuracy in a communication system where the most appropriate anchor nodes for a target node may be continually changing. Other benefits of anchor selection include energy efficiency and optimizing resource usage by only activating only "good" anchor nodes.

The selection unit may be configured to select the set of anchor nodes from a plurality of anchor nodes that are all located within a cell served by a single base station. Anchor nodes in the same cell as the target node will in many instances be the closest anchor nodes to the target node and thus provide it with the most accurate positioning support available at the time. In other scenarios, not enough anchor nodes may be available in one cell, or the anchor nodes in neighbouring cells might actually be closer to the target node than anchor nodes in its own cell. The selection unit may also be configured to select the set of anchor nodes from a plurality of anchor nodes that are located in two or more cells, each of those cells being served by a different base station. This may increase the number of anchor nodes in the selected set, which can contribute to lowering latency of localisation by ensuring that there are a sufficient number of high quality anchor nodes that lead to a faster localisation with the pre-determined accuracy. The selection unit may be implemented in nodes that are at different levels in the network hierarchy: in the radio access network and the core network. This contributes to the flexibility of the system, since selection units can identify anchor nodes in just one cell or in multiple cells, depending on what is appropriate at the time when the target node requires positioning support.

According to a third aspect, a node is provided for operating in a communication system that comprises a target node, whose location is to be determined. The node comprises a transmitter configured to provide positioning support to the target node via a sidelink between the node and the target node. The node also comprises a decision unit that is configured to monitor one or more positioning factors that determine a desirability of the node providing positioning support to the target node. The decision unit is configured to assess whether or not it should be providing positioning support to the target node by comparing the monitored positioning factor(s) with a predetermined decision criterion. It is also configured to control the transmitter to not provide positioning support to the target node if the monitored positioning factor(s) satisfy the decision criterion. In many scenarios the decision unit will have better knowledge of the node's current situation than the network. It is ideally placed to decide not to provide positioning support to a target node if that support might be misleading or unhelpful to the target node. This can contribute to better positioning accuracy and lower latency at the target node, while also optimizing the available sidelink resource usage.

The decision unit may be configured to assess whether or not it should be providing positioning support to the target node in dependence on a predetermined decision criterion that is provided to the node by a network node in the communication system. The decision unit thus enables the network to have an indirect influence over when it does and does not provide positioning support, which is appropriate since the network has global view of the communication system that is not available to a single remote node.

The node may comprise a location unit configured to monitor one or more indications of the node's location to estimate an error in an estimated location for the node. The decision unit may be configured to cause the node to operate in an anchor mode, in which the transmitter will provide positioning support to the target node, if the location unit estimates that the error in the estimated location for the node is below a predetermined threshold. The decision unit may also be configured to cause the node to not operate in anchor mode, such that the transmitter will not provide positioning support to the target node, if the location unit estimates that the error in the estimated location for the node is above the predetermined threshold. In monitoring an error in an estimated location of the node, the location unit monitors a key factor that influences how helpful the node's positioning support is likely to be to another node. By taking the node out of anchor mode, the decision unit also removes it from a future anchor selection process at another node, allowing a more suitable node to take its place.

The transmitter may be configured to provide positioning support to the target node by periodically broadcasting positioning information via the sidelink. The decision unit may be configured to control the transmitter to not broadcast that positioning information if the decision criterion is satisfied. This helps to preserve the resources of the sidelink and battery life of the node. It also prevents the node from misleading the target node by broadcasting information that might not be correct in scenarios where the node's estimated location is actually not within an acceptable accuracy threshold.

The node may comprise a receiver configured to receive an instruction, from the target node or a network node in the communication system, for the node to provide positioning support to the target node. The decision unit may be configured to, if the decision criterion is satisfied, control the transmitter to not provide the instructed positioning support. The node may receive a signal from another anchor node that feeds into the decision unit and also affects the decision. The decision unit is thus able to avoid supplying potentially misleading data into the target node's localization calculation, even if the node has been preselected for providing positioning support to the target node.

According to a fourth aspect, a method is provided for determining the location of a target node in a communication system that comprises the target node and a plurality of anchor nodes whose location is known. The method comprises selecting a set of the plurality of anchor nodes to provide positioning support to the target node following the transmission of a request by the target node for positioning support from the anchor nodes. The method also comprises causing an instruction to be transmitted to each anchor node in the set instructing that anchor node to provide positioning support to the target node via a sidelink between that respective anchor node and the target node.

BRIEF DESCRIPTION OF DRAWINGS

The present disclosure will now be described by way of embodiments with reference to the accompanying drawings. In the drawings.

DESCRIPTION OF EMBODIMENTS

Figure 1:
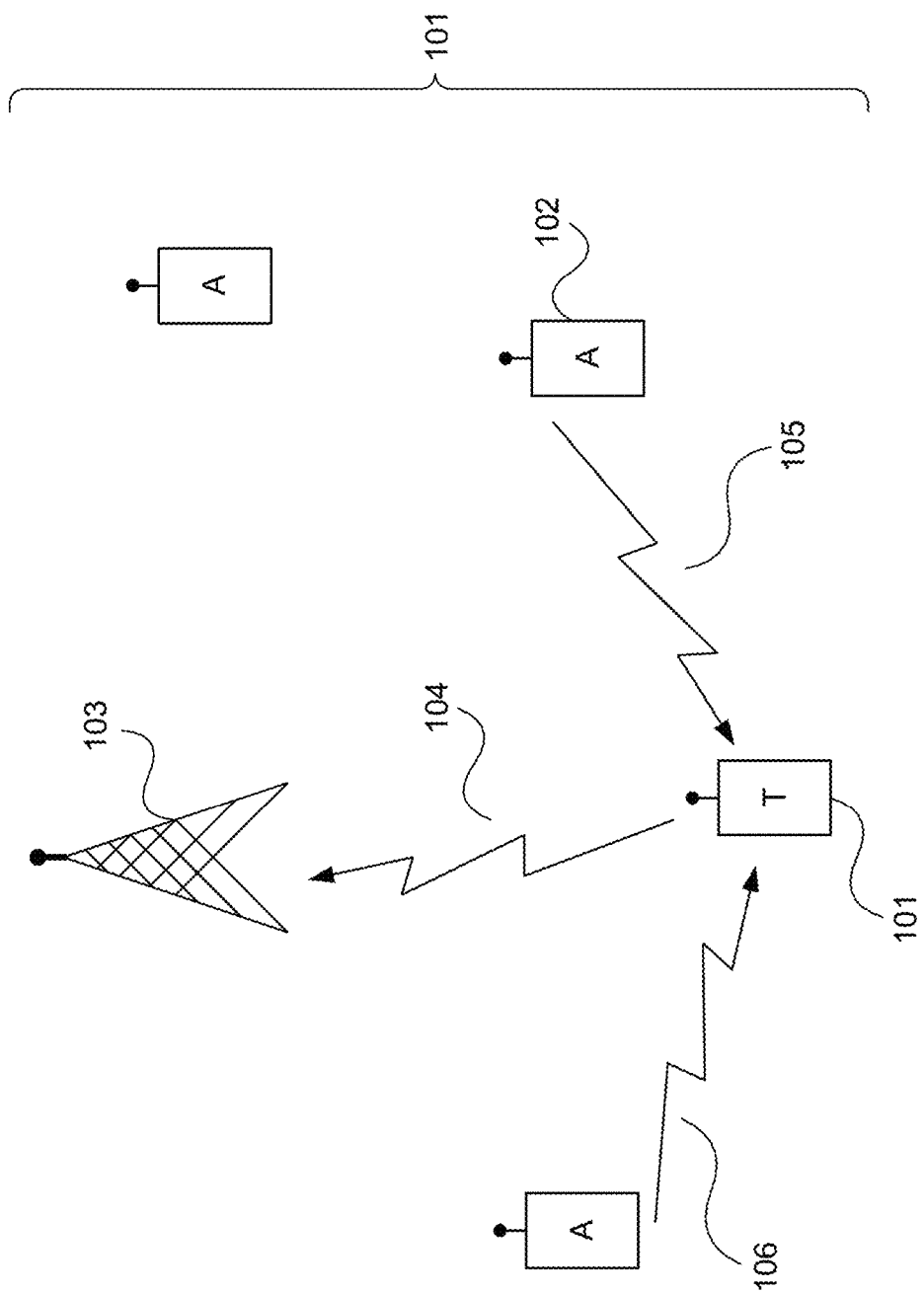
FIG. 1 shows an example of a communication system.

An example of a communication system is shown at 101 in FIG. 1. The communication system includes a network node 103 and a plurality of nodes 101, 102 which are remote from the network and configured to communicate wirelessly with it. Some of these remote nodes are designated as "anchor" nodes 102. These are remote nodes that are in a position to help other remote nodes localise their position via cooperative positioning. Usually a node is considered to be in this position because its location is "known", i.e. it has been estimated to within an acceptable accuracy threshold. Some anchor nodes might have a fixed position. Other anchor nodes might be mobile, so that their position is changeable. Other remote nodes are designated as "target" nodes 101. Usually these are nodes whose location is either unknown or is only known outside the acceptable accuracy threshold.

In the example of FIG. 1 the network node 103 is shown as forming part of the radio access network for the communication system. This network node is configured to communicate directly with the remote nodes 102, 102. The term "network node" is also used herein to refer to nodes that communicate only indirectly with the remote nodes. These network nodes may form part of the core network. They sit above the radio network access network in the network hierarchy and communicate with the remote nodes via network nodes that are part of the radio access network (e.g. network nodes such as network node 103). Network nodes in the core network will typically each communicate with multiple network nodes in the radio access network.

A remote node could, for example, be a generic user equipment, a mobile phone, smartphone, tablet, generic IoT device or any other device with wireless communication capability. A network node could be a base station or any other device forming part of the radio access network. It could also be a server or any other device forming part of the core network.

The remote nodes may be able to communicate with the network node via an uplink/downlink connection 104. They may also be able to communicate with other remote nodes via sidelinks 105, 106. The sidelink is a direct communication connection between remote nodes. It enables the remote nodes to exchange data directly, without that data having to be routed via the network. The term "sidelink" is currently used in 3GPP standards but it should be understood that its use herein is intended to cover any direct communication connection (or "direct link") between remote nodes and is not limited to direct links that are configured according to a 3GPP standard.

Figure 2:
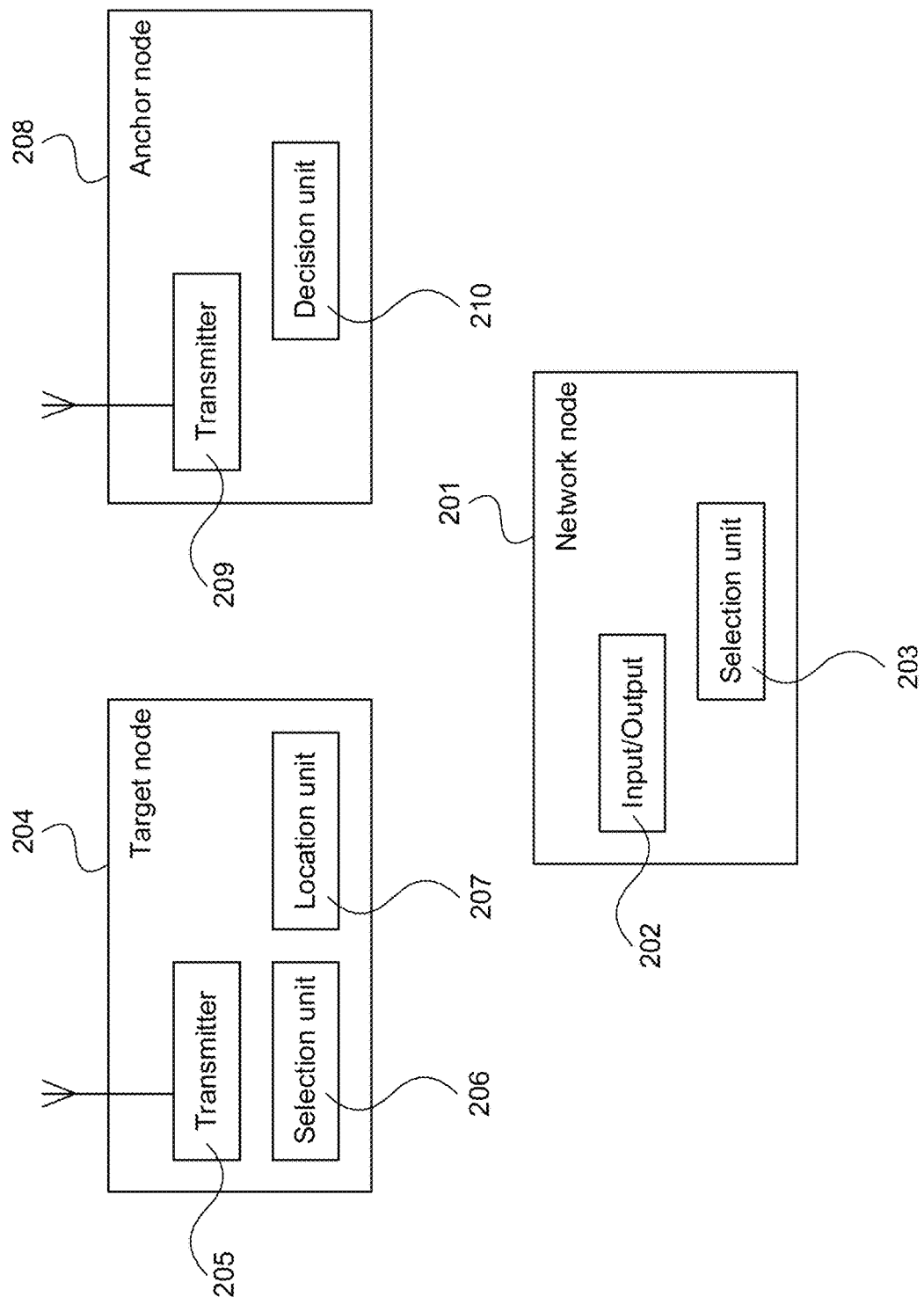
FIG. 2 shows examples of different communication nodes.

The sidelinks can be used for cooperation between the remote nodes. One application for this cooperation is positioning: anchor nodes can provide a target node with positioning support via the sidelink. More detailed examples of devices configured to take part in such a positioning system are shown in FIG. 2. They include a network node 201, a target node 204 and an anchor node 208.

Target node 204 comprises a transmitter 205, a selection unit 206 and a location unit 207. The location unit is configured to determine when the target node requires positioning support. The trigger for this determination might be the location unit establishing that an estimated location for the target node is outside of an acceptable accuracy threshold. The transmitter is configured to transmit a request for positioning support from the anchor nodes. That request might be transmitted to a number of different destinations, depending on what kind of positioning support the target node wants (as will become apparent from the detailed explanations below). In most implementations, the transmitter is likely to be implemented as part of a transceiver unit that is capable of both transmitting and receiving wireless data. Finally, the target node includes a selection unit that is configured to select a set of the available anchor nodes for providing positioning support and cause the transmitter to send a positioning instruction to those anchor nodes.

Network node 201 comprises an input/output 202 and a selection unit 203. The input is configured to receive a request for positioning support from the target node (204). In embodiments where the network node is part of the radio access network (such as a base station), input/output 202 is likely to be implemented by a wireless transceiver. In embodiments where the network node is part of the core network, input/output 202 could be a wireless transceiver, but it could also be an input/output port implementing a wired connection between the network node and the radio access network. The selection unit 203 is essentially the same as selection unit 206 in that it is also configured to select set of the available anchor nodes for providing positioning support to the target node. It also causes a positioning instruction to be sent to those anchor nodes, although in the network node's case that instruction might be triggered by the network node rather than directly transmitted by it (as will become apparent from the detailed explanations below).

Anchor node 208 comprises a transmitter 209 and a decision unit 210. As before, the transmitter is likely to be implemented as part of a transceiver unit that is capable of both transmitting and receiving wireless data. The transmitter is configured to provide positioning support to a target node (204) via a sidelink between the anchor node and the target node. The decision unit is configured to generally monitor one or more positioning factors that affect how desirable it is for the anchor node to provide positioning support to other nodes. These factors can be particular to the node—such as how accurate its current estimate of its location is—or can be factors that are applicable to the wider communication system—such as the number of surrounding anchor nodes that are transmitting positioning beacons. The decision unit assesses whether or not it should be providing positioning support to other nodes by comparing the monitored factors with one or more decision criteria. If one or more of the criteria are met, the decision unit is configured to prevent the transmitter from providing positioning support to the target node. In some embodiments the decision unit might even trigger the anchor node to change its operational state from being an "anchor" to being a "target" (more information about this is given below).

As indicated by the fact that one node may be able to operate both as an anchor and as a target, and to interchange between the two, the target node 204 and the anchor node 208 are likely to be the same in most implementations. Thus both target node 204 and anchor node 208 are likely to have a transmitter (205, 209), a selection unit (206), a location unit (207) and a decision unit (210). FIG. 2 shows the nodes as being different simply because it concentrates on the functional blocks that a remote node will use when operating in accordance with a particular positioning state.

The structures shown in FIG. 2 (and all the block apparatus diagrams included herein) are intended to correspond to a number of functional blocks. This is for illustrative purposes only. FIG. 2 is not intended to define a strict division between different parts of hardware on a chip or between different programs, procedures or functions in software. In some embodiments, some or all of the signalling techniques described herein will be coordinated wholly or partly by a processor acting under software control. That software can be embodied in a non-transitory machine readable storage medium having stored thereon processor executable instructions for implementing some or all of the signalling procedures described herein.

For the remote node the processor could, for example, be a central processor of a mobile phone, smartphone, tablet, generic IoT device or any other device with wireless communication capability. For a network node, the processor could be a central processor of a base station or other device forming part of the radio access network, or it could be part of the processing capability of a server in the core network.

Some or all of the signal processing operations described herein might also be performed wholly or partly in hardware. This particularly applies to techniques incorporating repetitive operations, such as the formation of standard messages. It also applies to transmit and receive techniques; any transmitters and receivers described herein are likely to include dedicated hardware to perform functions such as frequency mixing, code cover mixing, symbol demapping, frequency transforms, subcarrier demapping etc.

The specific components found in any transmitters and receivers will be dependent on the exact waveform and telecommunications protocol that the receiver is configured to implement. One or more implementations of the disclosure are described below with reference to an application in which the receiver is configured to operate in accordance with the 3GPP TS 36.211 standard, particularly from Release 12 onwards. Those standards define the PC5 interface (commonly referred to as the sidelink). This is for the purposes of example only; it should be understood that the scope of the disclosure is not limited to any particular waveform or telecommunications protocol and any suitable waveform or telecommunications protocol could be used.

Figure 3:
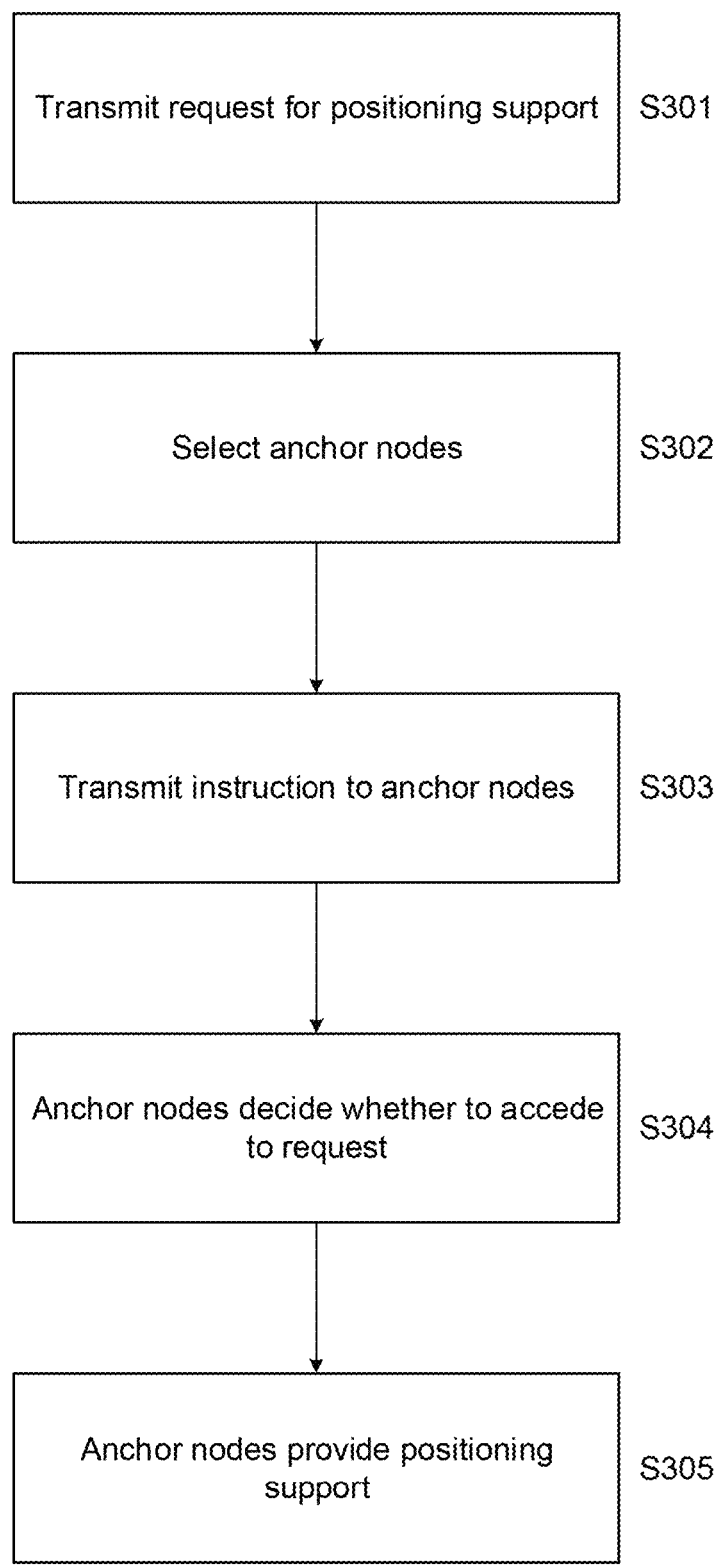
FIG. 3 is a flowchart illustrating a general basis for a signalling framework for exchanging positioning-related signals.

The flowchart of FIG. 3 provides an overview of the key steps in an overall signalling framework that can be adapted to different positioning scenarios. In summary, the flowchart of FIG. 3 comprises a target node transmitting a request for positioning support (step S301), followed by a step of selecting a set of anchor nodes for meeting that request (step S302). This triggers the transmission of a positioning instruction to anchor nodes in the selected set (step S303). In some embodiments, the anchor nodes can choose whether or not to comply with that instruction (step S304). The anchor nodes then provide positioning support to the target node via the sidelink (step S305).

In order to implement the signalling framework of FIG. 3 in a practical sense, a number of different messages and logical functions are defined:

"CP request": This message is transmitted by the target node (204) to request cooperative positioning (CP) support. It contains an identifier for the target node and specifies a "CP mode". The "CP mode" allows the target node to specify one of multiple different types of cooperative positioning support, depending on what the target node requires.

"CP response": This message is used by the target nodes (204) to obtain information about the anchor nodes (208). The CP response is broadcast by anchor nodes on the sidelink. The CP response includes the anchor node identity, the anchor node position coordinates (absolute or relative to the positions of a mutually known landmark), the anchor node position precision, and the CP radio resource configuration and transmission configuration for the positioning reference signal. The target node can use this information for anchor node selection and/or for receiving a position reference signal.

"CP confirmation": This message is used to trigger the transmission of a positioning reference signal by the selected anchor nodes (208). It is typically broadcast on the sidelink by the target node (204) and identifies the selected (or in some instances, reselected) anchor nodes.

"CP termination": This message is broadcast via the sidelink or uplink by the target node (204). It contains the localisation status of the target node and its purpose is to indicate that the target node has no further requirement for CP support. This message is optional and is particularly useful when the target node only requires a one-time localisation. If the CP termination is transmitted on the uplink, the radio access network suitably relays the message to the relevant anchor nodes on the downlink and/or to the core network via the backhaul, in order to terminate transmission of a position referencing signal by the anchor nodes.

"CP assignment": This message is broadcast by the relevant node in the radio access network (e.g. the serving base station) in the downlink in order to configure and initiate transmission of a positioning reference signal by the selected anchor nodes (208). This message is decoded by both the target node (204) and the anchor nodes since it carries information for communication of the position reference signal. The CP assignment includes the identifiers for the selected anchor nodes, the resource allocation for the position reference signal of each selected anchor node, and the schedule and duration of the transmission of the position reference signal for each selected anchor node.

"Anchor decision": This is a logical function that selects a set of candidate anchor nodes (208) to support a target node's (204) request for cooperative positioning. This function is performed either by the network node (201) or by the anchor nodes. The decision criteria for candidate anchor node selection include one or more of the following: resource availability, power consumption or battery status of the anchor nodes, number of target nodes requesting CP support, availability of other anchor nodes based on prior discovery of surrounding anchor nodes etc.

"Anchor selection": This logical function selects a set of anchor nodes (208) from the set of candidate anchor nodes and is performed at either the network node (201) or the target node (204), depending on the scenario. The anchor selection criteria include one or more of the following: geometrical distribution of the anchor nodes, precision of the anchor nodes, link quality etc. (Link quality might be determined, for example, by the SINR of a transmission received from the anchor node, which might be based on the receipt of the CP response by the target node).

"Position reference signal": a reference signal dedicated to device-to-device positioning. This signal is broadcast by anchor nodes (208) using specified resources on the sidelink. The target node (204) uses the received signal to perform time of arrival measurements for each anchor node transmission.

The specific steps shown in FIG. 3 can be performed by different devices in the communication system, and in different ways, depending on the particular positioning scenario. A more detailed explanation of each step, and how it might be implemented in practice, is given below. This is followed by specific examples of how the signalling framework embodied by FIG. 3 can be adapted to a number of specific positioning scenarios.

The method of FIG. 3 commences with the transmission of a request for positioning support (step S301). This request is transmitted by transmitter 205 of target node 204. In some embodiments the request will be triggered by a location unit (207) in the target node determining that the node needs positioning support from the anchor nodes—e.g. because an application in the target node requires the node's position to a greater degree of accuracy than the location unit can currently provide.

The request is the "CP request" message. It contains an identifier for the target node and specifies a "CP mode". The "CP mode" allows the target node to specify one of multiple different types of cooperative positioning support, depending on what the target node requires. Possible options include:

Distributed CP: CP that involves just the target node and its surrounding anchor nodes Centralized CP: CP that is controlled predominantly by the network, and Hybrid CP: CP that is controlled by both the network and the target node.

The transmitter (205) suitably transmits the CP request over a type of link that is dependent on the type of CP support being requested. For example, the CP request may be transmitted on the sidelink (distributed CP), on the uplink interface (centralized CP) or over both interfaces (hybrid CP). The transceiver suitably also transmits the CP request in a manner that is also dependent on the type of CP support that the target node (204) wants. For example, the CP request may be unicast or broadcast. The transmitter is likely to transmit the CP request in a unicast manner if the node wants centralised CP or hybrid CP (i.e. where the CP request is transmitted via the uplink). The transmitter is likely to broadcast the CP request if the node wants distributed CP or hybrid CP (i.e. where the CP request is transmitted via the sidelink).

Following the transmission of the request for positioning support, a set of anchor nodes is selected to meet that request (step S302). This selection can take place in the target node (204) or in the network node (201), depending on what type of positioning support has been requested. Both the network node and the target node include a selection unit (203, 206) for performing this step.

In the target node, the trigger for performing the selection step is the receipt of a CP response from an anchor node or a network node. In the network node, the trigger for performing the selection step is the receipt of a request from the target node via input/output 202. In implementations where the network node is part of the radio access network, the network node might not receive the same CP request as that transmitted by the target node, as the radio access network might pass the request to the core network in a different form from that in which it was originally received.

One option for selecting the set of anchor nodes is for the selection units to perform the anchor selection logical function (as defined above). In this function, the selection is made from an initial set of candidate anchor nodes. There are a number of ways in which this set of candidate anchor nodes might be chosen. In one embodiment, the candidate anchor nodes may be chosen using a relatively non-specific set of criteria. For example, the set of candidate anchor nodes might be any remote node that has the status of anchor and is located within transmission range of the target node. The candidate anchor nodes might be in the same cell as the target node or in a different cell (as will become apparent from some of the particular scenarios described below). In some embodiments, the candidate set of anchor nodes may be determined using the anchor decision logical function (as will become apparent from the positioning scenarios described below). For example, selection unit 203 of network node 201 may implement the anchor decision function before performing anchor selection.

There are also a number of ways in which this set of anchor nodes for providing positioning support to the target node might be chosen. The selection units (203, 206) are preferably configured to apply one or more selection criteria to the available anchor nodes to select a subset of those nodes that are perceived as being the most capable of providing the target node with positioning support. At least some of those criteria will typically be more selective than the criteria that determined the candidate set of anchor nodes. The anchor selection criteria might include one or more of the following: geometrical distribution of the anchor nodes, precision of the anchor nodes, link quality with the anchor nodes etc. In one embodiment the selection units (203, 206) select the set of anchor nodes for providing positioning support to the target node by implementing the anchor selection logical function.

The selection units may pick a fixed number of anchor nodes for the selected set, in which case the selection units (203, 206) may rank the candidate anchor nodes in terms of their perceived desirability and select the top-ranked anchor nodes corresponding to the required number.

One benefit of selecting a set of potential anchor nodes after the target node has transmitted its request for positioning support is that it enables the anchor nodes to be selected dynamically. This contributes to improved positioning accuracy as anchor node selection can be tailored to the relative situations of the target node and the anchor nodes and to channel conditions as they exist at the time.

In step S303 an instruction is transmitted to the selected anchor nodes asking them to provide the target node with positioning support. In some scenarios this instruction will be transmitted by the transmitter (205) of the target node (204). The transmitter will send a "CP confirmation" message. This message is used to trigger the transmission of a positioning reference signal by the selected anchor nodes. It is typically broadcast on the sidelink by the target node and identifies the selected anchor nodes.

In other scenarios the network node (201) will cause the instructions to be issued. In some embodiments the network node sends the instructions directly. For example, in scenarios where the network node is part of the radio access network, it transmits the instructions via input/output 202 to the selected anchor nodes. In other embodiments the network node may trigger the target node or another network node to transmit the instructions. For example, in scenarios where either the network node is part of the core network, so it does not transmit messages over the air interface itself, or in scenarios where the network node informs the target node of the selected anchors and leaves it to instruct those anchor nodes directly.

The message issued by the network node (201) to cause the transmission of the anchor node instructions is termed the "CP assignment". This message is broadcast by the relevant node in the radio access network (e.g. the serving base station) in the downlink in order to configure and initiate transmission of the position reference signal by the selected anchor nodes. This message is decoded by both the target node (204) and the anchor nodes (208) since it carries information for communication of the position reference signal. The CP assignment includes the identifiers for the selected anchor nodes, the resource allocation for the positioning reference signal of each selected anchor node, and the schedule and duration of the transmission of the positioning reference signal for each selected anchor node.

In step S304 the decision unit (210) of the anchor node (208) optionally decides whether or not to provide positioning support to the target node (204). It can thus be within the anchor node's power to reject instructions to provide positioning support. One option is for the decision unit to perform the anchor decision function. This is a logical function that selects a set of candidate anchor nodes to support a target node's request for cooperative positioning. The decision criteria for the anchor decision function include one or more of the following: resource availability, power consumption or battery status of the anchor node, number of target nodes requesting CP, availability of other anchor nodes based on prior discovery of surrounding anchor nodes etc.

One benefit to the anchor node having the power to select whether or not to accede to a positioning request is that the anchor node has better knowledge of its own current situation than the network or another remote node. Giving the anchor node this capability can thus contribute to improved positioning accuracy, as well as improved battery consumption at the anchor node.

Finally, in step S305 the transmitter (209) of the anchor node provides the target node (204) with positioning support. In some embodiments this positioning support takes the form of a position reference signal. In other embodiments the position reference signal may be preceded by the transmitter (209) transmitting positioning information that the target node can use to obtain information about the anchor node, which it needs to receive the position reference signal. This positioning information can also be considered to be positioning support that the anchor node provides to the target node.

The anchor node (208) may provide the target node (204) with positioning information by transmitting a "CP response" message: this message is used by the target nodes to obtain information about the anchor nodes that it needs to receive the position reference signal and determine its location. The CP response is broadcast by anchor nodes on the sidelink. The CP response includes the anchor node identity, the anchor node position coordinates (absolute or relative to the positions of a mutually known landmark), the anchor node position precision, and the CP radio resource configuration and transmission configuration for the positioning reference signal. The target node uses this information to receive the positioning reference signal. (In some of the positioning scenarios described below, the CP response might be transmitted earlier in the procedure and the target node might use as part of its anchor node selection).

FIG. 3 has been described with reference to various messages that can be transmitted between the target node, the anchor node and the network node as part of the signalling framework and also with reference to various logical functions that can be performed by the target node, the anchor node or the network node. It should be understood that these messages and logical functions are not limited to the specific steps in the process that they have been associated with above. They can also be transmitted/performed at other stages in the process, depending on the scenario, as will be apparent from some of the scenarios described below.

The signalling framework that is shown in FIG. 3 will now be expanded and adapted to show how this general framework can be applied in different positioning scenarios.

Centralised Cooperative Positioning

In this scheme, the selection of anchor nodes for CP is under complete control of the network (either a base station or a node in the core network). This scheme can be used where the target node and all the selected/candidate anchor nodes are in coverage of the network. Two sub-cases of this scheme are described below. They require slightly different signalling procedures depending on whether all of the cooperating remote nodes are in the same cell or in different cells.

Figure 4:
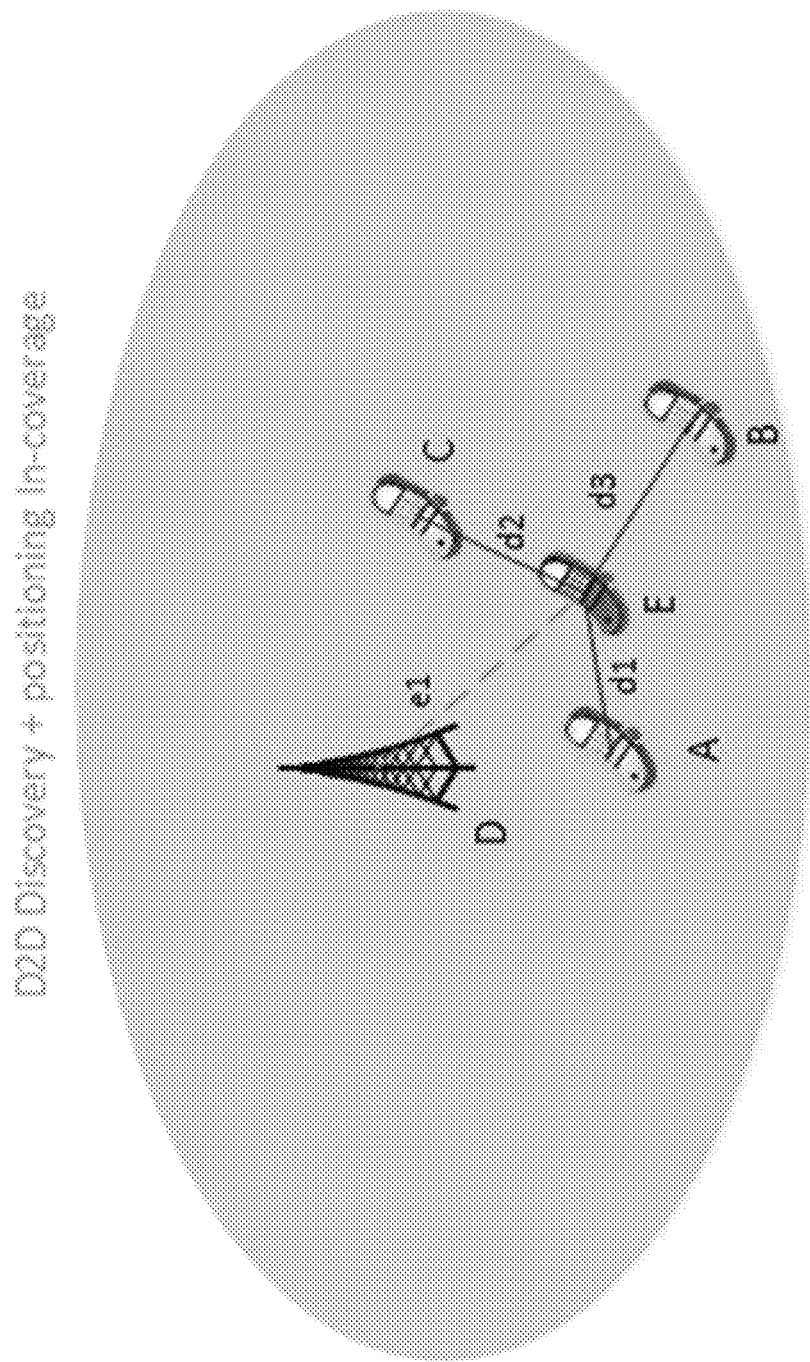
FIG. 4 shows an arrangement of communication nodes for a positioning scenario in which the remote nodes are in-coverage and in the same cell.

The scenario in which all of the cooperating remote nodes are in the same cell is shown in FIG. 4. The target node E and the anchor nodes A, B and C belong to the same serving base station (BS) D. BS D coordinates the CP procedure for the requesting target node E by selecting and assigning the anchors A, B and C which then communicate directly with E (via broadcast) on the D2D interfaces d1, d2, d3 to support the localisation of E.

Figure 5:
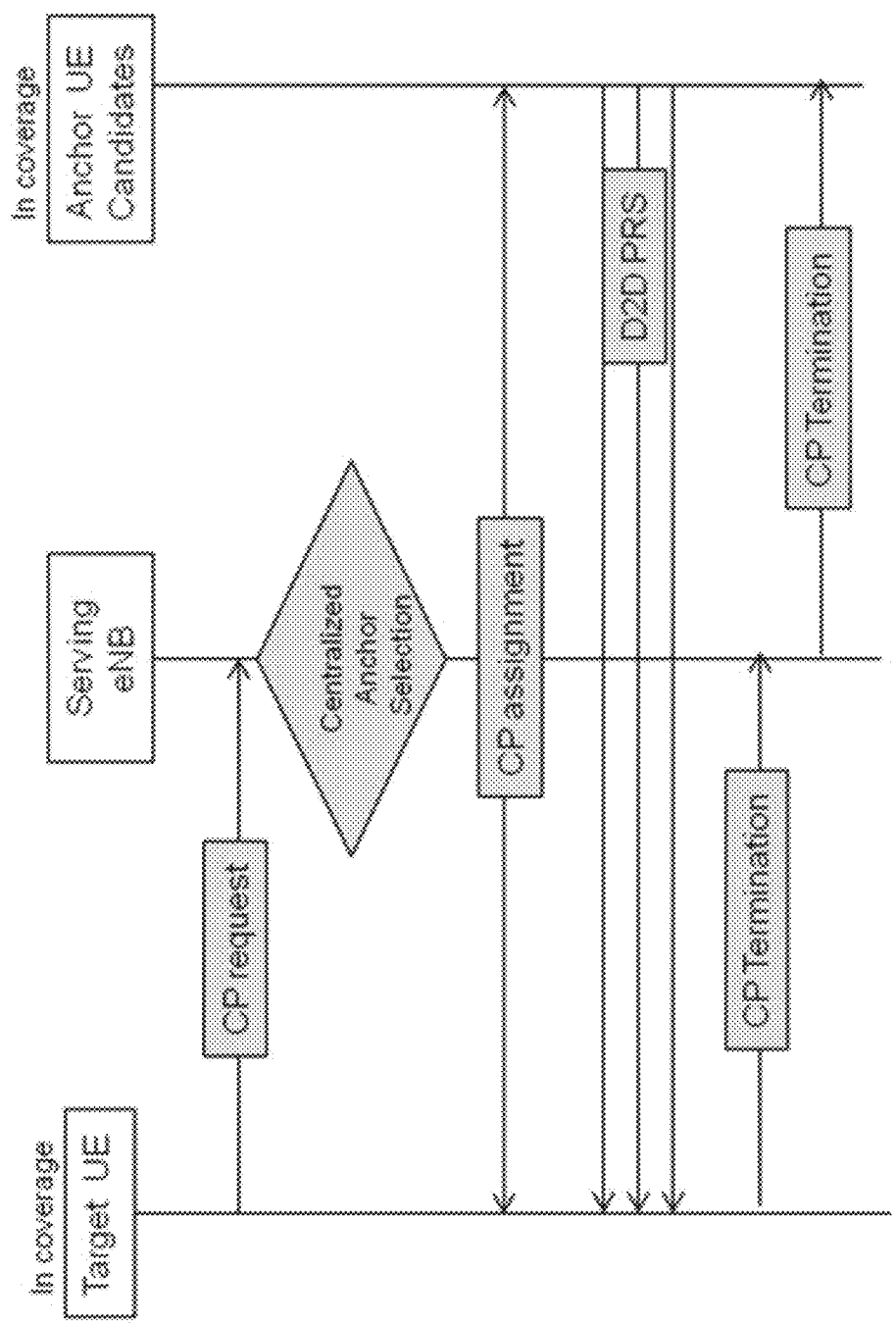
FIG. 5 shows a signalling exchange between communication nodes according to a centralised CP scheme in which the remote nodes are all in the same cell.

FIG. 5 shows an example of a signalling exchange for a positioning scenario in which the target node and the candidate anchor nodes are all in-coverage of the same serving BS:

The target node requiring CP support transmits the CP request in the uplink (via unicast) indicating the CP Mode as "Centralised CP".

The BS receives the CP request and performs the anchor selection function.

The BS broadcasts the CP assignment on the downlink containing the IDs of the selected anchor nodes, their respective position reference signal transmission configurations and (optionally) their respective durations of transmission.

After receiving and decoding the CP assignment message, the selected anchor nodes will start or continue broadcasting the position reference signal via the sidelink, according to the configurations instructed by BS in the CP assignment message, for the duration optionally indicated in the same message. The target node decodes the same CP assignment message to receive the positioning reference signal in the sidelink.

When the target node's position is localised to within an acceptable accuracy threshold, it optionally transmits the CP termination message (unicast) on the uplink. This message is relayed by the serving BS to a subset or all of the selected anchor nodes who in turn stop transmitting the position reference signal. The target node may also change its state to "anchor".

Figure 6:
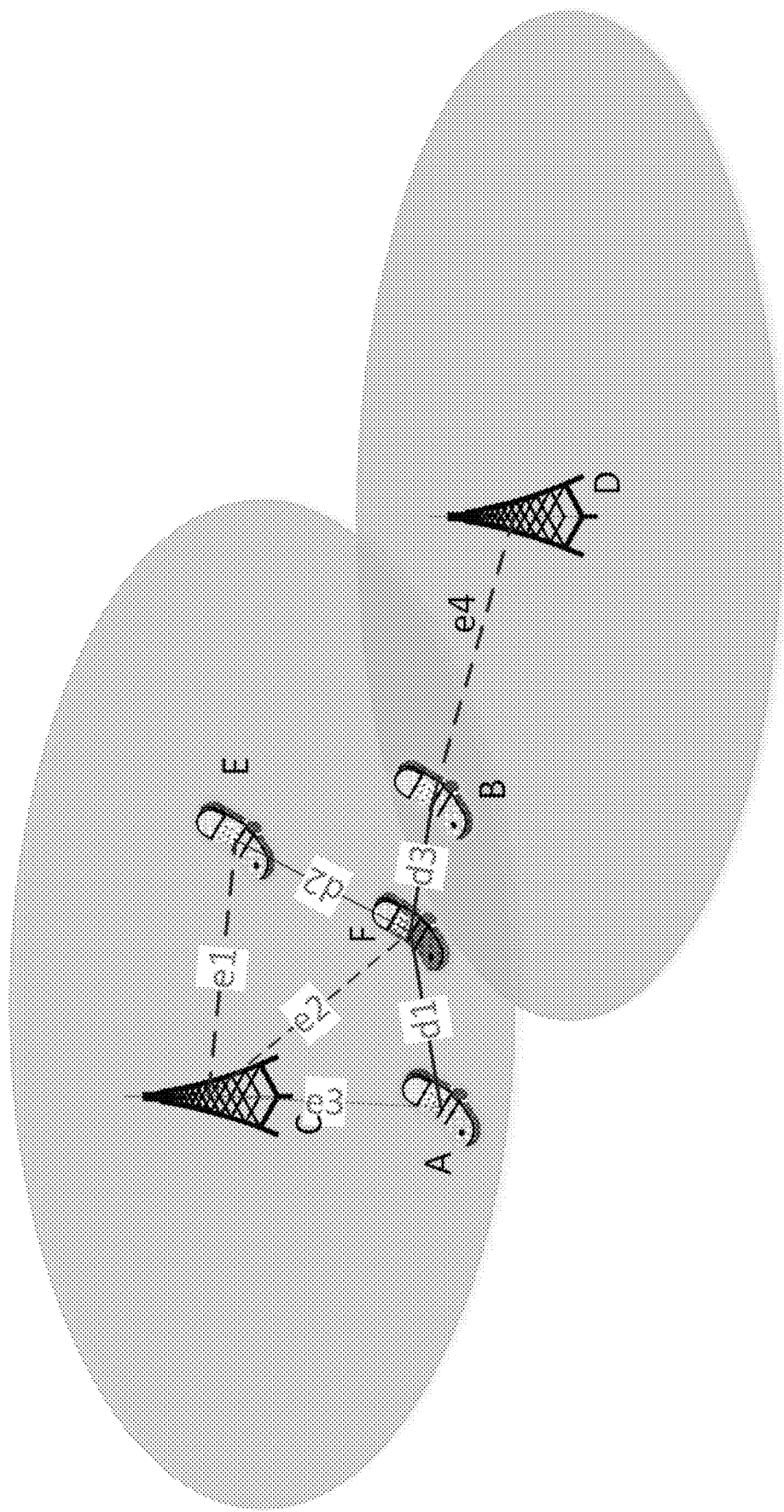
FIG. 6 shows an arrangement of communication nodes for a positioning scenario in which the remote nodes are in-coverage and in neighbouring cells.

The scenario in which some of the cooperating remote nodes are in a neighbouring cell is shown in FIG. 6. The target node F and anchor nodes A and E are served by BS C while another selected anchor node B is served by BS D of the neighbouring cell D. Target node F requests CP from its serving cell via the cellular uplink (e2) interface. BS C, in conjunction with other network nodes (e.g. an E-SMLC) then performs a joint-anchor selection and assignment where the set of anchor nodes {A, B, E} are assigned for the cooperative positioning procedure of target node F. Once assigned and activated the anchor nodes and target node communicate directly over the D2D interface (d1, d2, d3). Assistance information is exchanged over the cellular uplink and downlink interfaces (e1-4) to enable the CP procedure.

Figure 7:
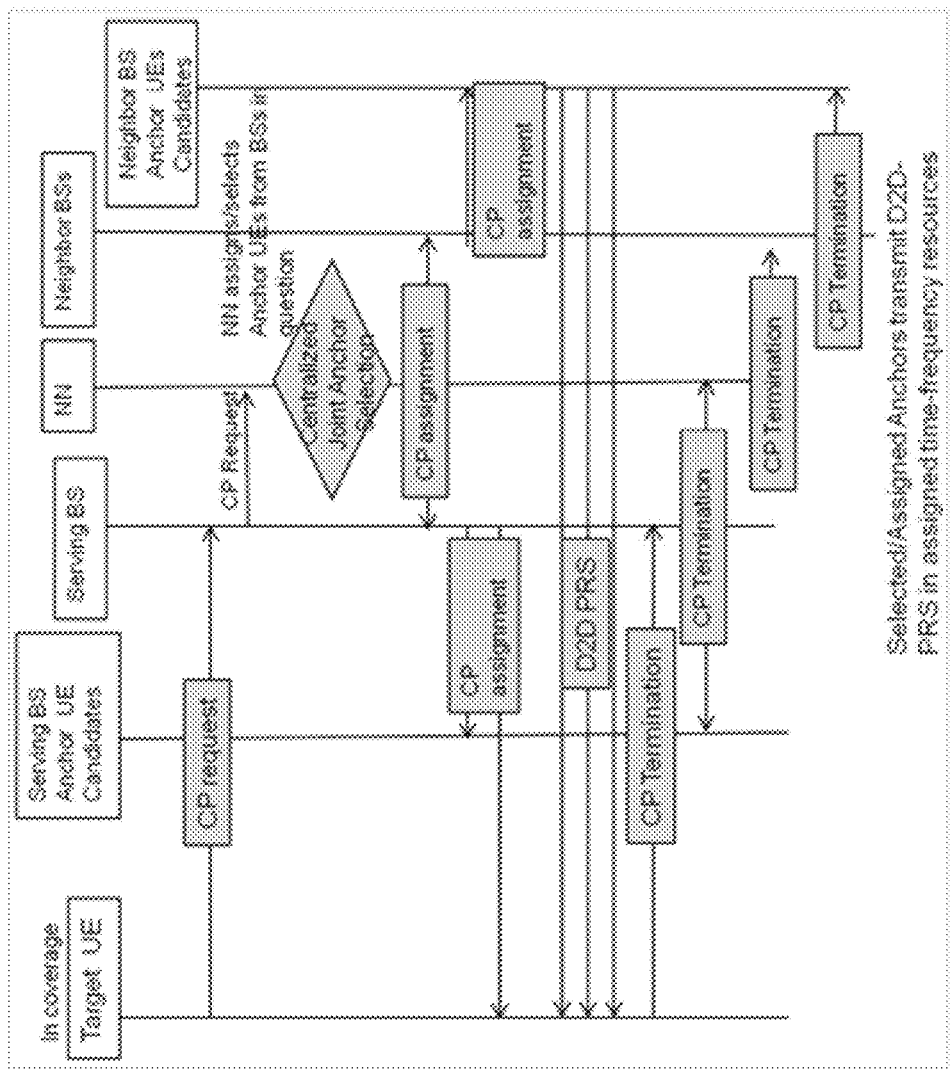
FIG. 7 shows a signalling exchange between communication nodes according to a centralised CP scheme in which the remote nodes are in neighbouring cells.

FIG. 7 shows an example of a signalling exchange for a positioning scenario in which the target node and some of the candidate anchor nodes are in coverage of neighbouring cells:

The target node requiring CP support transmits the CP request in the uplink (via unicast) indicating the CP Mode as "Centralised CP".

When the serving BS receives the CP Request, the request is forwarded to the network node (NN) because the serving BS does not always have an up-to-date global view of candidate anchor nodes in neighbouring cells, particularly when compared with the overview that a centralized NN has.

If there are insufficient Anchor UEs in the serving cell or if the serving BS or NN decides to assign a neighbour cell anchor node in the CP process, anchor nodes from neighbouring cells can participate in the cooperating positioning process for a target node located in the serving cell. This is also applicable to scenarios in which a higher positioning accuracy and/or lower latency than usual are required by the target node, as this can require a higher number of anchor nodes.

The NN performs a joint anchor selection, where it selects the candidate anchor nodes from neighbouring cells, assigns a position reference signal transmission configuration in the CP assignment message and sends this message to the relevant BSs.

The respective BSs then broadcast the CP assignments on the downlink containing the IDs of the selected anchor nodes, their respective positioning reference signal transmission configurations and (optionally) their respective durations of transmission.

After receiving and decoding the CP assignment message, the selected anchor nodes will start or continue broadcasting the position reference signal in the sidelink, according to the configurations instructed by BSs in their respective CP assignment messages for the duration optionally indicated in those messages. The target node decodes the same CP assignment message to receive the positioning reference signal via the sidelink.

When the target node's position is localised to within an acceptable accuracy threshold, it optionally transmits the CP termination message (unicast) on the uplink. This message is relayed by the serving BS to the NN and also to a subset or all of the selected anchor nodes. The NN also forwards this CP termination message to the neighbouring BS so that it can be relayed to any anchor nodes in the neighbouring cell. The target node may also change its state to "anchor".

Distributed Cooperative Positioning

This scheme is a target node-controlled cooperative positioning scheme that does not actively involve the network. Two different variants are described below based on anchor node behaviour. The first is a request-based reactive CP method. The second is a beacon-based proactive CP method.

Figure 8:
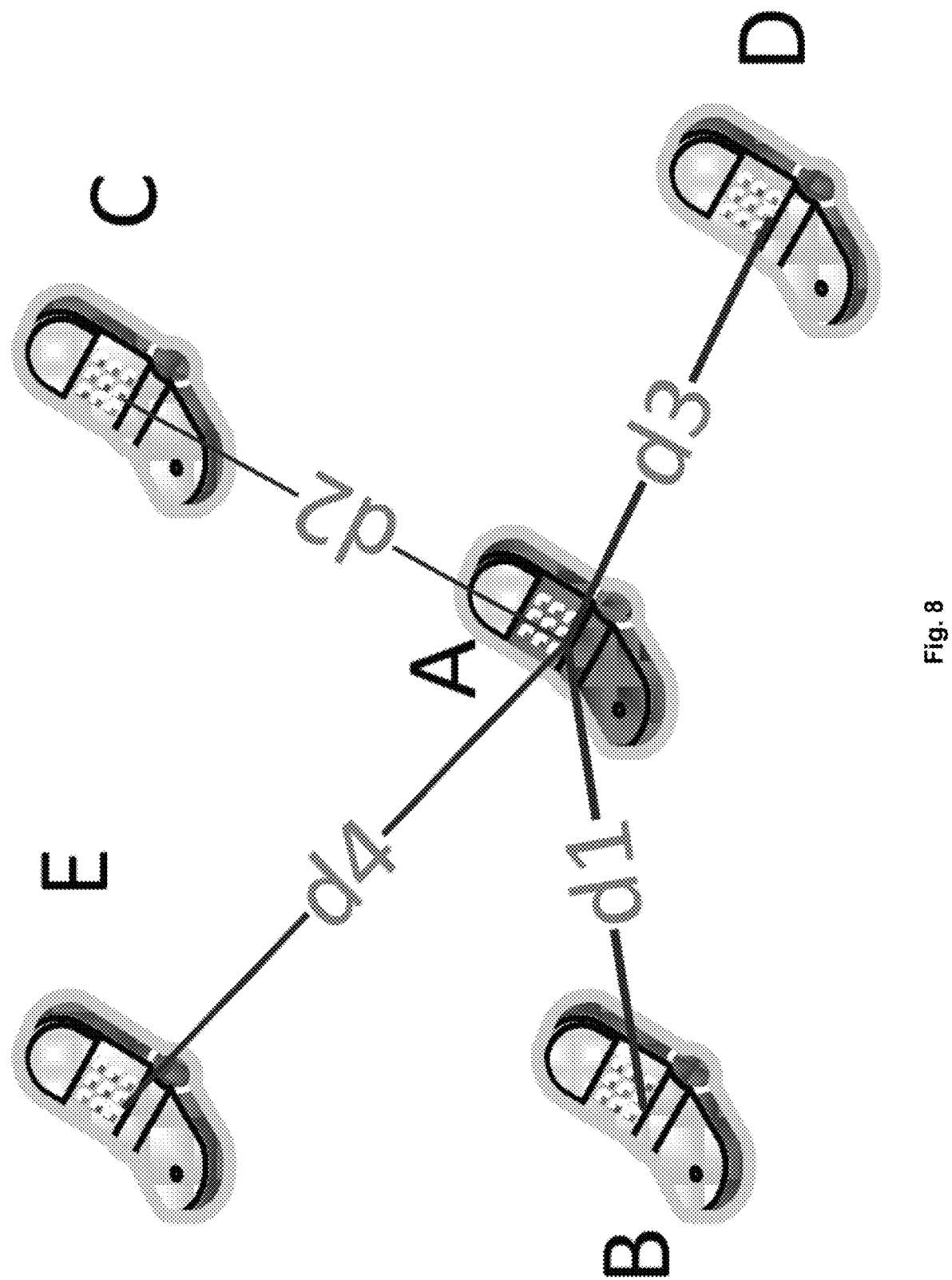
FIG. 8 shows an arrangement of communication nodes for a positioning scenario in which the remote nodes are out-of-coverage.

FIG. 8 shows an example of a scenario in which a target node A is surrounded by four anchor nodes B-E. All communication between the nodes occurs on the D2D links d1-4 without active network involvement. The network might play a role by indirectly influencing node behaviour (both for the anchor nodes and the target node). An example of such network influence is the pre-configuration of particular anchor nodes to proactively broadcast beacons indicating their availability to support cooperative positioning.

Figure 9B:
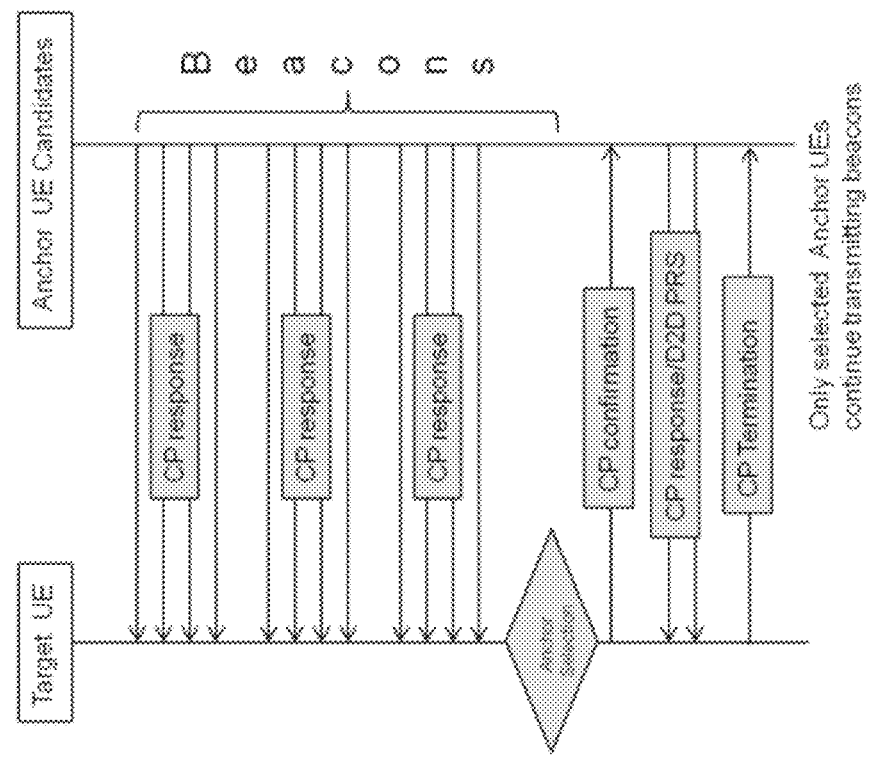
FIGS. 9(a) and (b) shows signalling exchanges between communication nodes according to a distributed CP scheme.
Figure 9A:
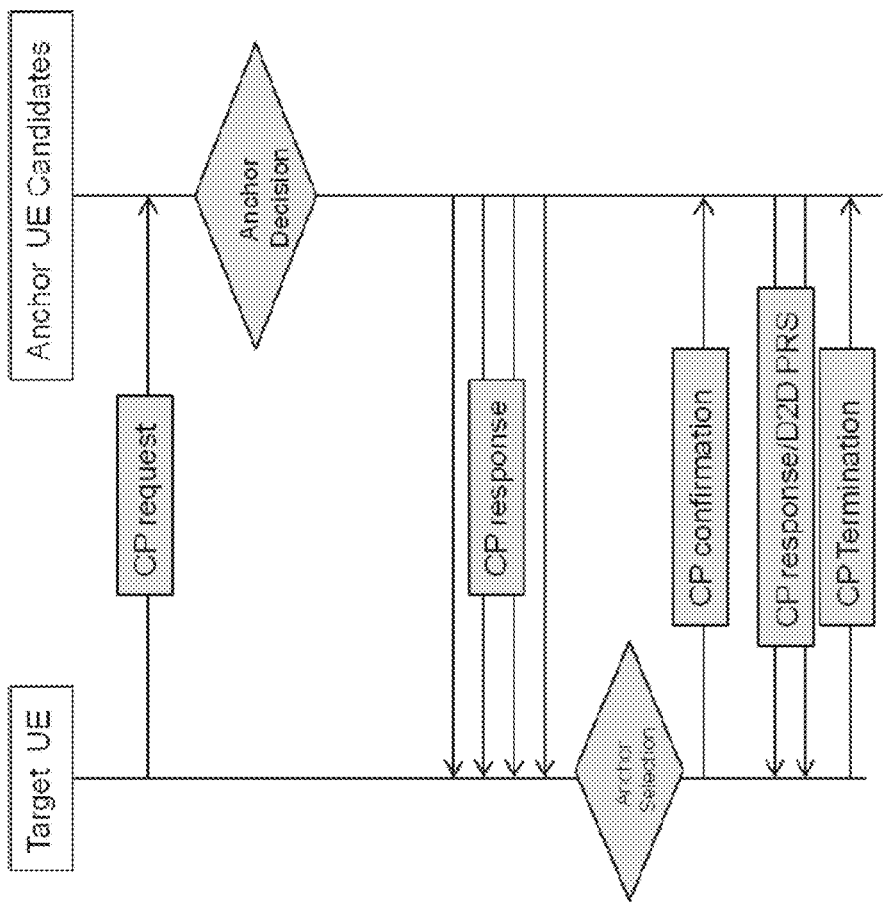

FIG. 9(a) shows an example of a signalling exchange in the first, request-based variant of the distributed cooperative positioning scheme:

The target node requiring CP support transmits the CP request via the sidelink (broadcast) indicating the CP mode as "Distributed CP". This request initiates or continues a cooperative positioning process.

Anchor nodes receiving the sidelink CP request perform an anchor decision function and decide whether or not to participate in the CP.

If the anchor nodes which receive the CP request decide to aid in cooperative positioning of the target node, they broadcast the CP response on the sidelink.

The target node obtains positioning information for the surrounding anchor nodes by means of the CP response messages and performs anchor selection by selecting a subset of the candidate anchor nodes.

In a dynamic environment, target node has the option of reselecting the anchor nodes (termed "anchor reselection") by resending the CP request and repeating the procedure.

After the selection of the anchor nodes, the target node broadcasts the CP confirmation message, which includes the Anchor IDs of the selected anchor nodes.

The anchor nodes start or continue to broadcast their position reference signal via the sidelink if they decode their ID in the CP confirmation message. If an anchor node that is already transmitting position reference signal observes that its ID is not included in the last CP confirmation message from a target node (e.g. during anchor reselection), it may stop transmitting the positon reference signal. The anchor node may apply various decision criteria to this decision, some examples of which are described below.

The anchor nodes continue to transmit the position reference signal until either the period specified in the CP response expires or the decision criteria for stopping transmission are met, whichever occurs first.

If the target node's position is localised to within an acceptable accuracy threshold before the anchor nodes finishes broadcasting the position reference signal, the target node can broadcast the (optional) CP termination message to stop anchor transmission of the position reference signal and save sidelink resources.

FIG. 9(b) shows an example of a signalling exchange in the second, beacon-based variant of the distributed cooperative positioning scheme. This signalling exchange differs from the others described herein because it is not triggered by the target node transmitting a CP request. This signalling exchange is included for completeness and because it also demonstrates another scenario in which an anchor node may decide to stop providing positioning support to a target node.

- Anchor nodes broadcast the CP response periodically to indicate their availability as CP anchors for potential target nodes. This decision to proactively signal their availability for CP can be pre-configured by the network (e.g. based on the node's positioning capability) or decided by the anchor nodes' own estimation of their positioning accuracy.
- The target node obtains positioning information for the surrounding anchor nodes by means of the CP response messages and performs anchor selection by selecting a subset of the candidate anchor nodes.
- In a dynamic environment, the target node has the option of reselecting the anchor nodes (termed "anchor reselection") by repeating the selection procedure.
- After the selection of the anchor nodes, the target node broadcasts the CP confirmation message, which includes the Anchor IDs of the selected anchor nodes.
- The anchor nodes start or continue to broadcast their position reference signal via the sidelink if they decode their ID in the CP confirmation message. If an anchor node that is already transmitting position reference signal observes that its ID is not included in the last CP confirmation message from a target node (e.g. during anchor reselection), it may stop transmitting its position reference signal. The anchor node may apply various criteria to this decision, some examples of which are described below.
- The anchor nodes continue to transmit the position reference signal until either the period specified in the CP response expires or the decision criteria for stopping transmission are met, whichever occurs first.
- If the target node's position is localised to within an acceptable accuracy threshold before the anchor nodes finish broadcasting the position reference signal, it can broadcast the (optional) CP termination message to stop anchor transmission of the position reference signal and save sidelink resources.

This method shown in FIG. 9(b) obviates the need for the target node to request CP and the subsequent anchor decision process in the anchor nodes, reducing signalling overhead, positioning latency and node processing.

Hybrid Cooperative Positioning

This scheme involves elements of both centralised CP (in-coverage and network-controlled) and distributed CP (which can be out-of-coverage and is controlled by the anchor nodes). This scheme is typically applicable to a cell-edge target node, which is in-coverage but whose localisation can be improved by extending the number of anchor nodes beyond what the network alone might suggest. The splitting of the control mechanism for anchor selection between the network node and the anchor node gives this cooperative positioning scheme its hybrid nature.

Figure 10:
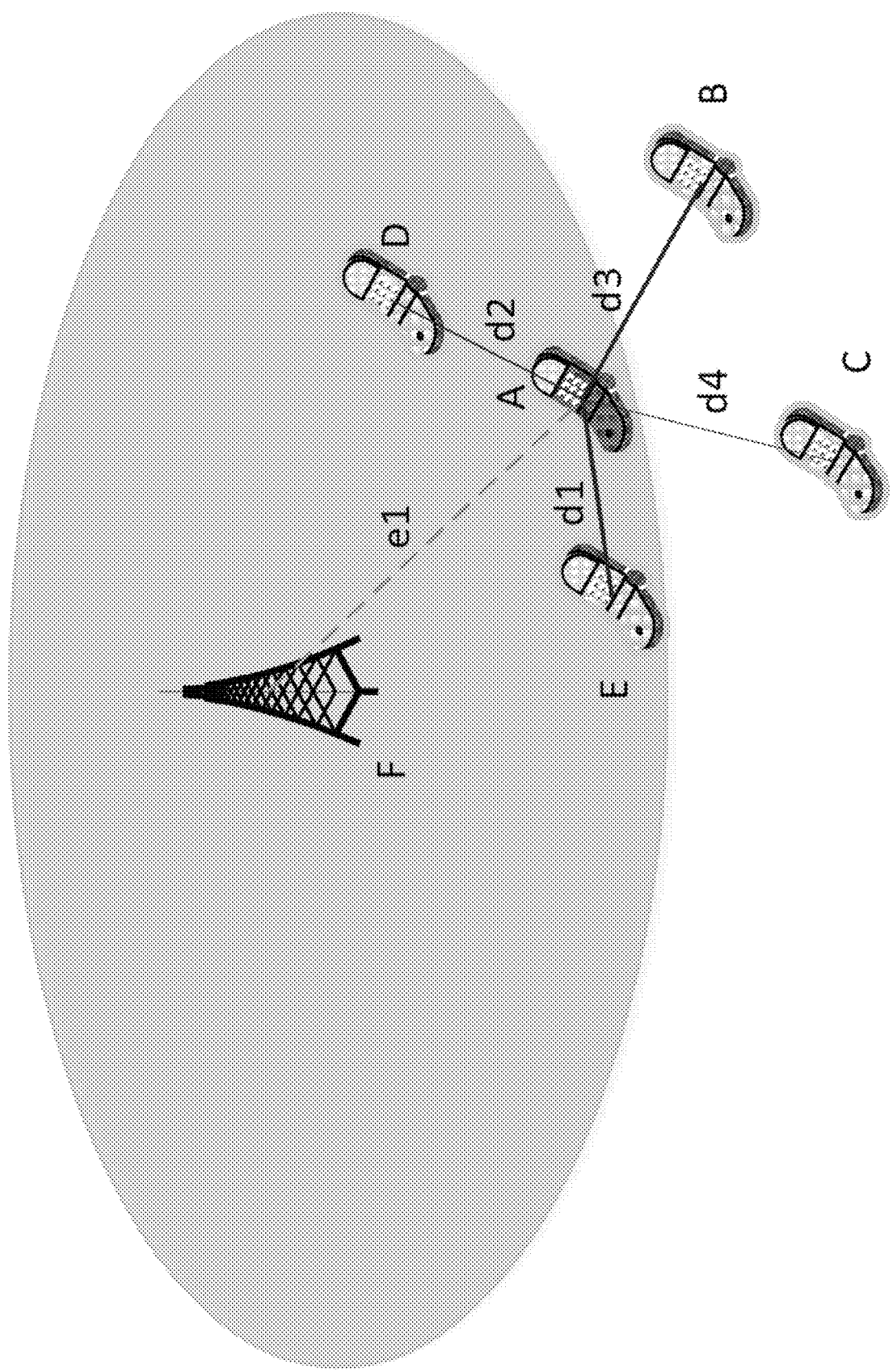
FIG. 10 shows an arrangement of communication nodes for a positioning scenario in which some of the remote nodes are in-coverage and some of the remote nodes are out-of-coverage.

In FIG. 10, the target node A and the candidate in-coverage anchor nodes, E and D, are in the same cell F, whereas the candidate anchor nodes B and C are out of coverage. The target node makes the anchor selection from the available set of anchor nodes {B, C, D, E} and proceeds with the cooperative positioning procedure.

Figure 11:
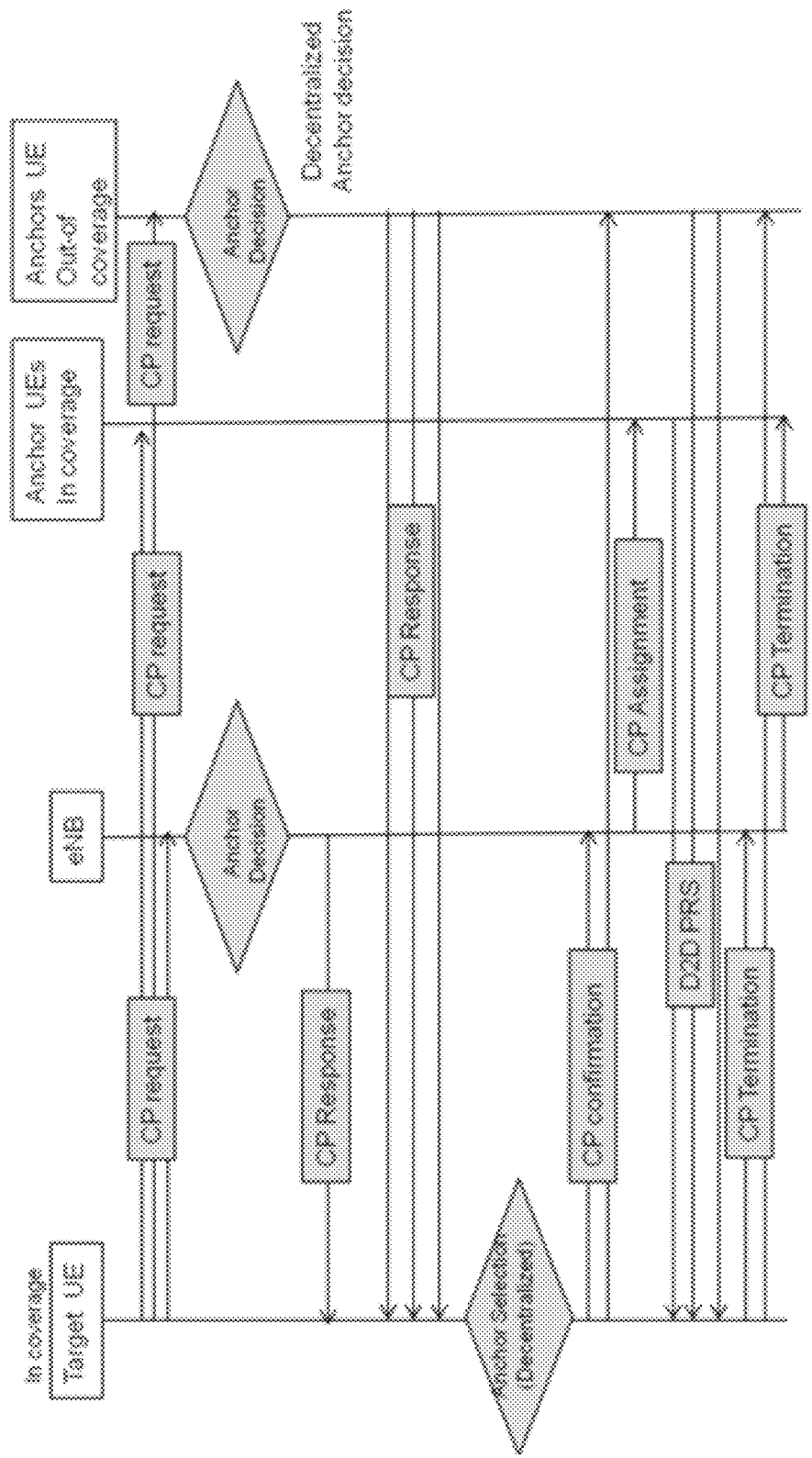
FIG. 11 shows a signalling exchange between communication nodes according to a hybrid CP scheme.

FIG. 11 shows an example of a signalling exchange for a hybrid positioning scenario such as that shown in FIG. 10:

- The target node requiring CP support transmits the CP request both on the uplink (unicast to BS) and on the sidelink (broadcast to the surrounding remote nodes), indicating the CP mode as hybrid.
- The BS receives and decodes the CP request and performs an anchor decision function (instead of the usual anchor selection) based on the hybrid CP mode indicated in the CP request.
- Out-of-coverage anchor nodes receiving the sidelink CP request also perform anchor decision function and decide whether or not to participate in the CP.
- After the anchor decision is taken by both the BS and the out-of-coverage anchor nodes, they transmit their CP response messages to the target node on the downlink and sidelink respectively.
- The target node decodes the CP response messages and makes an anchor selection for both in-coverage and out-of-coverage anchor nodes. The target node preferably takes into account potential resource collisions between the two sets of candidate anchor nodes when making the selection.
- The target node transmits the result of the anchor selection function in the CP confirmation message, which it transmits on the uplink (unicast) and the sidelink (broadcast) to the BS and the out-of-coverage anchor nodes respectively.
- The BS transmits the CP assignment in the downlink to the in-coverage anchor nodes, based on the CP confirmation from the target node.
- The anchor nodes which receive the CP assignment begin the transmitting the position reference signal via the sidelink with using the position reference configuration (such as resource allocation, scheduling and period) given in the CP assignment.
- Out-of-coverage anchor nodes also start transmitting the position reference signal via the sidelink when they decode the CP confirmation from the target node.
- When the target node's position is localised to within an acceptable accuracy threshold, it optionally transmits the CP termination message (unicast) on the uplink and on the sidelink (broadcast). The target node may also change its state to "anchor".

Decision Criteria at the Anchor Node

The anchor node comprises a decision unit that is configured to generally monitor one or more positioning factors that affect how desirable it is for the anchor node to provide positioning support to other nodes (as mentioned above). Two specific embodiments in which the decision unit assesses whether or not it should be providing positioning support to a target node in dependence on one or more decision criteria are described below.

Stopping Periodic Transmission of CP Response

Anchor nodes that are broadcasting periodically a CP response may stop doing so based one or a combination of different decision criteria. Preferably these criteria relate to factors in the node or external to the node that the node observes for a pre-configured period of time. Examples include the number of target nodes that the anchor is serving, an estimate of the anchor node's own positioning error, the number of surrounding anchor nodes that are also transmitting CP response beacons etc.

An example of a specific algorithm that might be employed by the decision unit of the anchor node is as follows:

Criterion 1:
For CP response sensing period $T_{sens}$:
If number of detected active anchor nodes (those broadcasting their CP responses), $n^{active}_{detected}$>Maximum number of detected active anchors $N^{max, \, active}_{detected}$
AND
If number of served Target UEs $n_{served}$ (UEs which have selected the Anchor UE in question)<$N^{min}_{served}$
STOP transmitting periodic CP response broadcast.

Criterion 2:
If estimated own positioning error $\varepsilon_{estimated}$>$\varepsilon_{max}$ for a duration $T_{pos\text{-}error \, duration}$ STOP Transmitting Periodic CP response broadcast $T_{sens}$, $N^{max, \, active}_{detected}$, $N^{min}_{served}$, $\varepsilon_{max}$, $T_{pos\text{-}error \, duration}$ are suitable thresholds that are configured by the network and provided to the anchor node.

The decision unit may determine that it should stop providing positioning support to the target node by periodically transmitting the CP response message, if it determines that either criterion 1 or criterion 2 is satisfied.

Node Positioning States

The "anchor" and "target" designations of each remote node may be fixed or changeable. In one preferred example, the "anchor" and "target" designations represent an operational state of a remote node, and the node may be configured to change between those states in dependence on how suited it is to acting as an anchor node. A decision about switching states may be made by a remote node independently or in conjunction with input from the network. Input from the network may be limited to indirect input, such as a set of parameters that define under what circumstances it should change state.

In one embodiment a node is configured to change its state based on the node's own estimate of the error in its current position estimate. The estimate of the error can be obtained by the decision unit by fusing measurements from various cellular and using non-cellular based positioning technologies such as GNSS, sensors, LiDAR etc.

Figure 12:
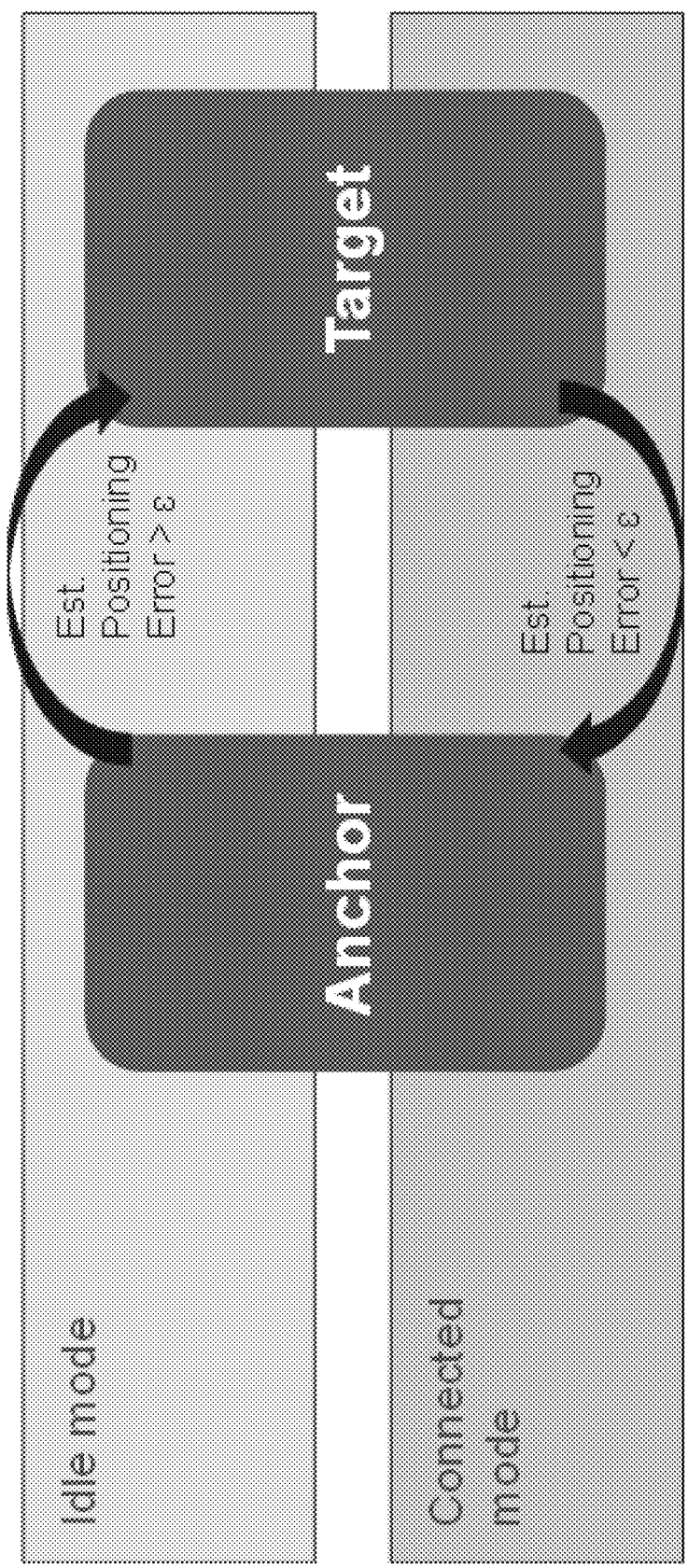
FIG. 12 shows a state transition diagram for a remote node showing its anchor and target positioning states.

The positioning states "anchor" and "target" are preferably independent of conventional cellular user equipment states (such as those belonging to RRC, NAS, EPC etc.). State transitions from anchor to target and vice versa are suitably based on a threshold set by the network. This threshold can be user-specific or service/application-specific. For example, different thresholds might be set for each of: V2X assisted driving, remote fleet management, Emergency-calling etc. An example of a node transitioning between the anchor and target states depending on its estimated position error is shown in FIG. 12. FIG. 12 also compares the new target and anchor states with the legacy RRC states "idle" and "connected".

The node's positioning state may be optionally communicated to the network. This may be achieved via dedicated signalling (e.g. using LPP/LPPa), or by embedding a notification of the node's positioning state in scheduled uplink transmissions (e.g. as part of the MAC Uplink Control Element). It may also be signalled implicitly via the physical layer (e.g. via multiplexed uplink control information like CQI, HARQ feedback etc.).

Position Reference Signal

As mentioned above, the signalling framework described herein may be beneficially implemented in a communication system that is configured to operate in accordance with the 3GPP TS 36.211 standard. Further details about the PC5 (sidelink) interface are defined in that standard and in other related standards (e.g. 3GPP TS 36.213, 36.212, 36.331 etc.). An example of a position reference signal that may be transmitted by anchor nodes operating in accordance with the 3GPP TS 36.211 standard is described below.

The target node will be denoted the "Target UE" and an anchor node will be denoted the "Anchor UE" in accordance with the terminology of the 3GPP TS 36.211 standard.

The position reference signal can be denoted the D2D Positioning Reference Signal (D2D-PRS). This is a sidelink physical signal that is specific to the UE and is transmitted by the Anchor UE on the sidelink to facilitate cooperative positioning for surrounding Target UEs. The purpose of the D2D-PRS is the same as that of legacy PRS in LTE: to provide additional OTDOA measurements for non-localized UEs. Several differences with the legacy PRS are that the D2D-PRS is a reference signal that is specific to the UE, it is parameterized by the Anchor UE's network identity and it is transmitted on the frequency band reserved for D2D communication. The D2D-PRS is only transmitted in the sidelink subframes configured for positioning.

D2D-PRS Sequence Generation

The D2D-PRS is a pseudo-random sequence (ex.: Zadoff-Chu, PN sequence etc.) that is parameterized by the Anchor UE's unique identity and is transmitted by the Anchor UE on the D2D (sidelink).

The D2D positioning reference-signal sequence $r^{D2D}_{l,n_s}(m)$ can be defined by:

$$r^{D2D}_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N^{max,SL}_{RB} - 1$$

Where $n_S$ is the slot number within a radio frame, l is the OFDM symbol number within the slot and $N^{max,SL}_{RB}$ is the maximum sidelink bandwidth configuration, expressed in multiples of $N^{RB}_{sc}$. The pseudo-random sequence c(i) is defined in 3GPP TS 36.211 standard. The pseudo-random sequence generator is initialised with:

$$c_{init} = 2^{10} \cdot (7 \cdot (n_s+1)+l+1) \cdot (2 \cdot N^{SL}_{ID}+1) + 2 \cdot N^{SL}_{ID} + N_{CP}$$

at the start of each OFDM symbol where $N^{SL}_{ID} \in \{0, 1, \ldots, 335\}$ is the physical layer sidelink synchronization identity. This is divided into two sets id_net and id_oon consisting of identities $\{0, 1, \ldots, 167\}$ and $\{168, 169, \ldots, 335\}$, referring to in-network and out-of-network coverage respectively.

$$N_{CP} = \begin{cases} 1 & \text{for normal } CP \\ 0 & \text{for extended } CP \end{cases}$$

D2D-PRS Resource Mapping

Figure 13:
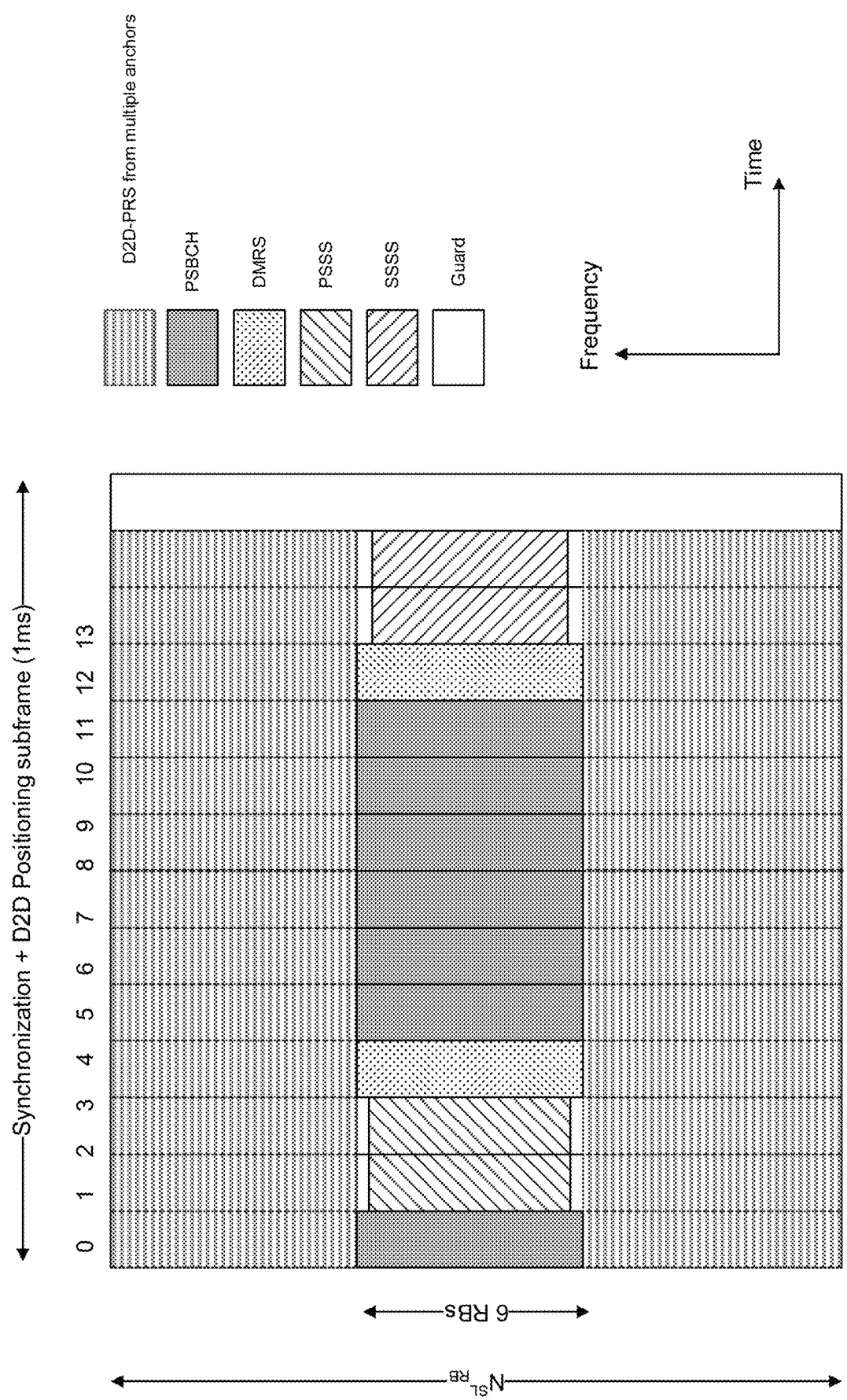
FIG. 13 shows resource mapping for a synchronisation and D2D positioning subframe.

The generated D2D-PRS sequence is mapped to the sidelink resource grid and transmitted on subframes configured for D2D-Positioning, as shown in FIG. 13.

Figure 14:
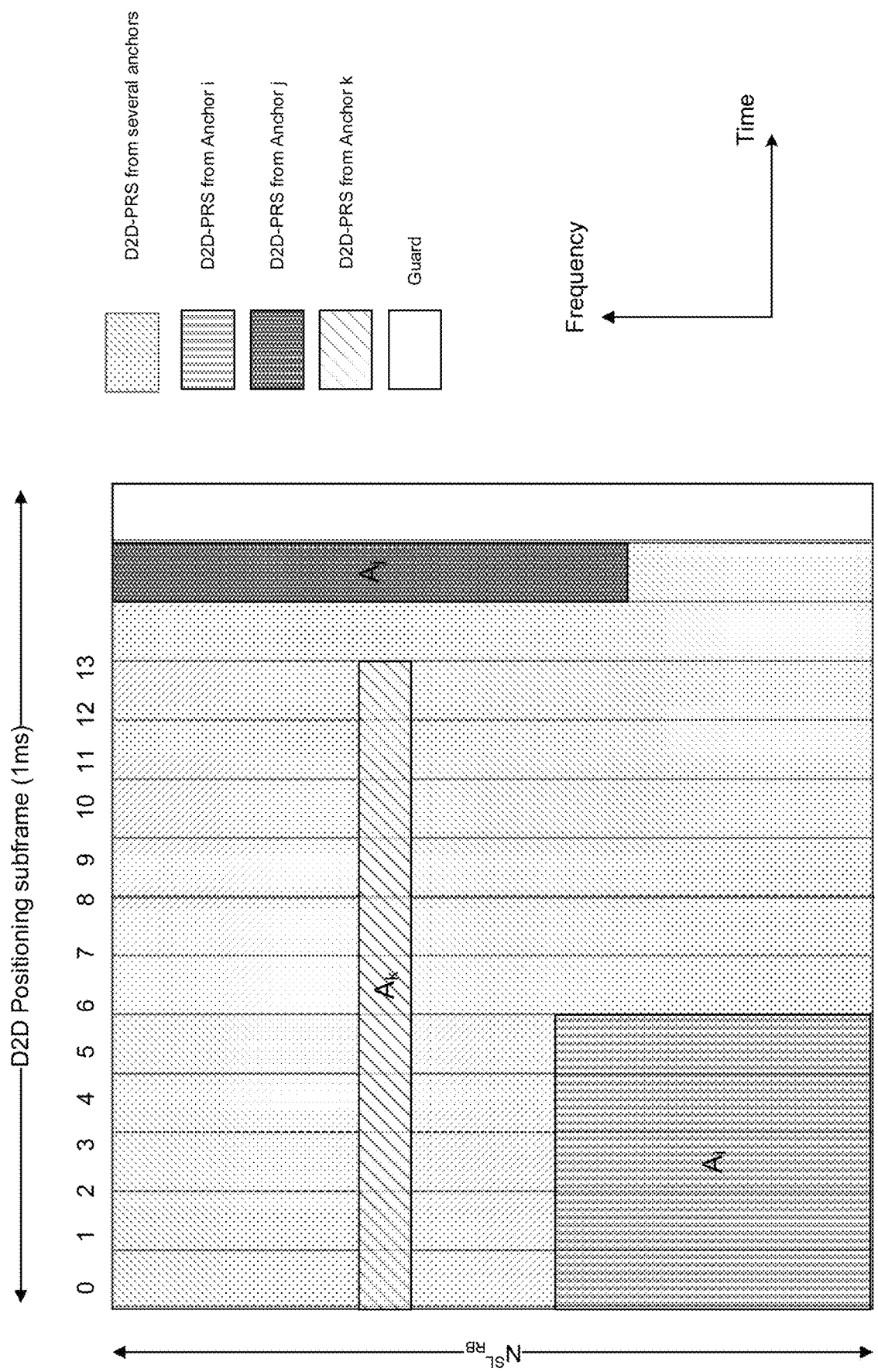
FIG. 14 shows time-frequency multiplexing of a D2D-PRS signals from several anchor nodes in a D2D positioning subframe.

The reference signal sequence $r^{D2D}_{l,n_s}(m)$ is mapped to complex-valued modulation symbols $a^{(p)}_{k,l}$ used as reference signal for a specified antenna port p configured for D2D-positioning, in slot $n_s$ according to:

$$a^{(p)}_{k,l} = r^{D2D}_{l,n_s}(m')$$

Where k,l∈$A_i$ is the time-frequency resource allocation $A_i$ for Anchor UE i, which is assigned either by the network or by the Anchor UE's themselves, depending on the scenario. FIG. 14 illustrates this allocation for an exemplary D2D Positioning subframe.

D2D-PRS Transmission Configuration

Figure 15:
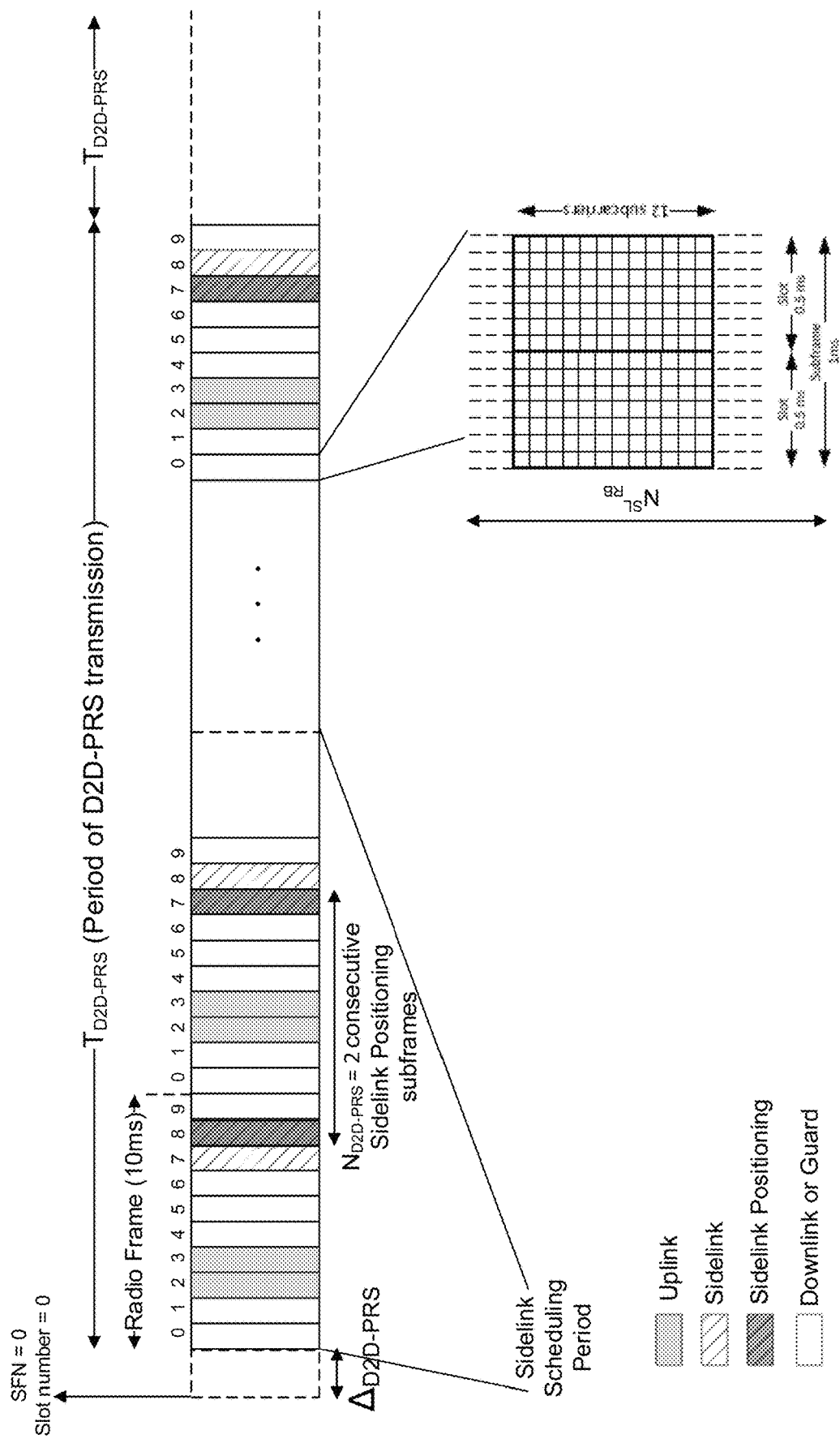
FIG. 15 shows a D2D-PRS transmission schedule.

The D2D-PRS transmission schedule is specified by the D2D-PRS transmission period $T_{D2D\text{-}PRS}$, which specifies (in frames or subframes) the number of consecutive D2D-Positioning subframes ($N_{D2D\text{-}PRS}$) and a frame or subframe offset ($\Delta_{D2D\text{-}PRS}$) relative to SFN 0 for the start of D2D-PRS transmissions. This is shown in FIG. 15.

The D2D-PRS transmission configuration is specified on a per 'Anchor UE' basis by the network for in-coverage Anchor UEs and is either pre-configured (by the network or by the Anchor UE) or autonomously decided by the Anchor UEs for out of coverage Anchor UEs. The D2D-PRS transmission configuration includes the D2D-PRS transmission schedule and the time-frequency resource allocation and completely specifies the scheduling and resource locations of D2D-PRS for a particular Anchor UE.

Localisation

The target node determines its position by means of a localisation calculation. Suitably this calculation takes as its input the orthogonal time difference of arrival (OTDOA) at the target node of the position reference signals from various anchor nodes. Another input is suitably the known location of those anchor nodes. The target node's position can then be determined via a multilateration technique.

The concepts described above may be beneficially implemented in scenarios which demand high positioning accuracy as well as high positioning availability and low positioning latency. Typically, these scenarios come under the umbrella of cooperative Intelligent Transport System (ITS) applications, including Highly Automated Driving (HAD), cooperative manoeuvres etc. The proposed positioning scheme can also be effectively applied Ultra Dense Networks (UDN) where the large density of devices is naturally exploited to increase the system level positioning performance. Another key area of application is for localisation of low-cost/low-power devices that are not equipped with high-quality GNSS receivers but still have moderate positioning requirements. Some classic examples of such devices are low-cost smart-phones, small modems on motorbikes/bicycles and small drones.

The concepts described above effect an efficient and practical signalling scheme to enable D2D-aided cooperative positioning within an OTDOA framework. This signalling framework provides the following benefits, compared to state of the art cellular OTDOA positioning:

Higher positioning accuracy

The higher density of cooperating nodes, the higher signal-to-interference and noise ratios (SINR) of D2D links due to the proximity between devices, the higher probability of line-or-sight communications (and the correspondingly lower non-line-of-sight biases) and dynamic anchor selection all contribute to better positioning accuracy compared with a legacy cellular-based OTDOA.

Greater availability of positioning

The concepts described above exploit the much higher density of remote nodes compared with base stations. This higher density of remote nodes, and the ability to use them as anchors, increases the probability of a non-localized node finding a sufficient number of anchor nodes to position itself. Furthermore, the proposed de-centralized and hybrid positioning schemes described above ensure that positioning service is available even in out-of-coverage situations such as coverage holes, network outages etc.

Lower latency of positioning

Positioning latency is related to the number of anchor nodes whose reference signals can be decoded by the target ("hearability"), as well as the decoding SNR of those received signals. In the interference-limited cellular downlink, the hearability of anchor nodes is severely impaired, leading to longer positioning latency. The concepts described above provide a comprehensive solution to exploit an additional degree of freedom—namely the D2D interface—to effectively increase the hearability of the anchor nodes and the decoding quality of their reference signals at the target node. These factors contribute to reducing positioning latency compared to cellular OTDOA positioning.

Figure 16:
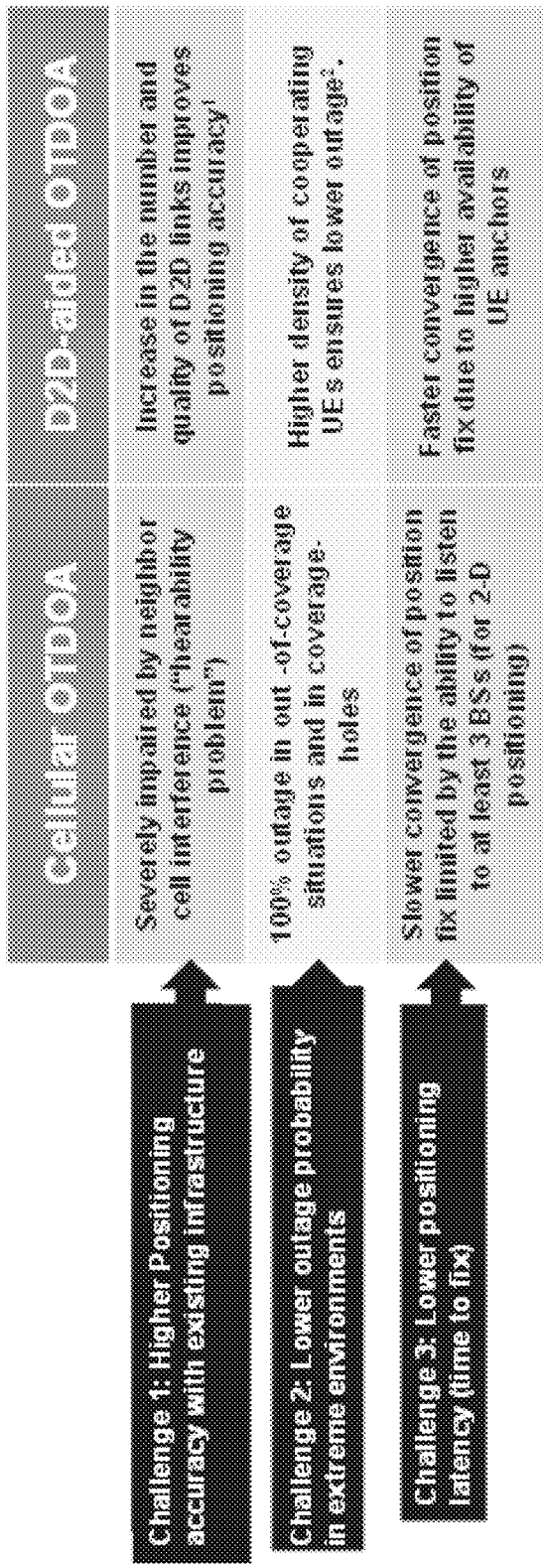
FIG. 16 illustrates various motivations behind D2D-aided positioning.

Some of these advantage are also outlined in FIG. 16.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

What is claimed is:

1. A node for operating in a communication system, the communication system comprising a plurality of anchor nodes having a respective known location, the node comprising:

a processor; and a memory storing instructions that, when executed by the processor, configure the node to perform steps comprising:

determining that the node requires positioning support from an anchor node of the plurality of anchor nodes;

transmitting a request for positioning support from the anchor node;

after the transmitting the request, selecting a set of anchor nodes of the plurality of anchor nodes for providing positioning support; and transmitting an instruction to each anchor node in the set of anchor nodes, wherein the instruction transmitted to each anchor node in the set of anchor nodes is configured to instruct each anchor node to provide positioning support to the node via a sidelink between each respective anchor node and the node, wherein the set of anchor nodes is dynamically selected based on information on the plurality of anchor nodes, wherein the request for positioning support is configured to specify a type of positioning support, and wherein the request for positioning support is transmitted over a link of a type that is dependent on the specified type of positioning support.

2. A node as claimed in claim 1, wherein the request for positioning support is transmitted to the plurality of anchor nodes via the sidelink between the node and each anchor node of the plurality of anchor nodes.

3. A node as claimed in claim 1, wherein the request for positioning support is transmitted via an uplink between a target node and a network node.

4. A node as claimed in claim 1, wherein the information on the plurality of anchor nodes is received from at least one of the plurality of anchor nodes and a network node.

5. A node as claimed in claim 1, wherein the memory stores further instructions that, when executed by the processor, configure the node to perform steps further comprising transmitting a termination instruction, after a location of the node has been determined with a predetermined accuracy, wherein the termination instruction causes the anchor nodes to cease providing the node with positioning support.

6. A node for operating in a communication system, the communication system comprising a plurality of anchor nodes having a respective known location and a target node having a location to be determined, the node comprising:
   a processor; and
   a memory storing instructions that, when executed by the processor, configure the node to perform steps comprising:
   receiving a request, from the target node, for positioning support from an anchor node of the plurality of anchor nodes;
   after the receiving the request from the target node, selecting a set of anchor nodes of the plurality of anchor nodes for providing positioning support to the target node; and
   causing an instruction to be transmitted to each anchor node in the set of anchor nodes to instruct each anchor node to provide positioning support to the target node via a sidelink between each respective anchor node of the set of anchor nodes and the target node,
   wherein the set of anchor nodes is dynamically selected based on information on the plurality of anchor nodes,
   wherein the request for positioning support specifies a type of positioning support, and
   wherein the request for positioning support is received over a link of a type that is dependent on the specified type of positioning support.

7. A node as claimed in claim 6, wherein the set of anchor nodes of the plurality of anchor nodes is selected from anchor nodes that are all located within a cell served by a single base station.

8. A node as claimed in claim 6, wherein the set of anchor nodes of the plurality of anchor nodes is selected from anchor nodes that are located in two or more cells, wherein at least one of the two or more cells is served by a different base station from other cells of the two or more cells.

9. A method for determining a location of a target node in a communication system, the communication system comprising the target node and a plurality of anchor nodes having a known location, wherein the method comprises:
   following a transmission of a request by the target node for positioning support from an anchor node of the plurality of anchor nodes, selecting a set of anchor nodes of the plurality of anchor nodes for providing positioning support to the target node; and
   causing an instruction to be transmitted to each anchor node in the set of anchor nodes to instruct each anchor node to provide positioning support to the target node via a sidelink between each respective anchor node and the target node,
   wherein the set of anchor nodes is dynamically selected based on information on the plurality of anchor nodes,
   wherein the request for positioning support specifies a type of positioning support, and
   wherein the request for positioning support is transmitted over a link of a type that is dependent on the specified type of positioning support.

* * * * *

UNITED STATES PATENT AND TRADEMARK OFFICE
CERTIFICATE OF CORRECTION

| | |
|---|---|
| PATENT NO. | : 11,304,171 B2 |
| APPLICATION NO. | : 16/380772 |
| DATED | : April 12, 2022 |
| INVENTOR(S) | : Gangakhedkar et al. |

It is certified that error appears in the above-identified patent and that said Letters Patent is hereby corrected as shown below:

On the Title Page

Page 2: Other Publications, Column 2, Line 30: "36.355 V13.1., pp. 1-141, 3rd Generation Partnership Project-" should read -- 36.355 V13.1.0, pp. 1-141, 3rd Generation Partnership Project - --.

Signed and Sealed this
Ninth Day of August, 2022

Katherine Kelly Vidal
*Director of the United States Patent and Trademark Office*